US011548533B2

(12) United States Patent
Liang et al.

(10) Patent No.: US 11,548,533 B2
(45) Date of Patent: Jan. 10, 2023

(54) PERCEPTION AND MOTION PREDICTION FOR AUTONOMOUS DEVICES

(71) Applicant: UATC, LLC, San Francisco, CA (US)

(72) Inventors: Ming Liang, Toronto (CA); Bin Yang, Toronto (CA); Yun Chen, Toronto (CA); Raquel Urtasun, Toronto (CA)

(73) Assignee: UATC, LLC, Mountain View, CA (US)

( * ) Notice: Subject to any disclaimer, the term of this patent is extended or adjusted under 35 U.S.C. 154(b) by 243 days.

(21) Appl. No.: 16/826,895

(22) Filed: Mar. 23, 2020

(65) Prior Publication Data

US 2020/0298891 A1 Sep. 24, 2020

Related U.S. Application Data

(60) Provisional application No. 62/942,380, filed on Dec. 2, 2019, provisional application No. 62/936,423, filed (Continued)

(51) Int. Cl.
*G06N 20/00* (2019.01)
*G06N 5/04* (2006.01)
(Continued)

(52) U.S. Cl.
CPC ....... *B60W 60/00272* (2020.02); *G01S 17/89* (2013.01); *G01S 17/931* (2020.01);
(Continued)

(58) Field of Classification Search
CPC ......... B60W 60/00272; B60W 2420/52; G01S 17/89; G01S 17/931; G05D 1/0088;
(Continued)

(56) References Cited

U.S. PATENT DOCUMENTS 9,760,806 B1 9/2017 Ning et al.
9,760,809 B2 9/2017 Mercier
(Continued)

OTHER PUBLICATIONS

International Search Report and Written Opinion for PCT/US2020/024174, dated May 13, 2020, 12 pages.
(Continued)

*Primary Examiner* — Peter D Nolan
*Assistant Examiner* — Ashley L Redhead, Jr.
(74) *Attorney, Agent, or Firm* — Dority & Manning, P.A.

(57) ABSTRACT

Systems, methods, tangible non-transitory computer-readable media, and devices associated with object perception and prediction of object motion are provided. For example, a plurality of temporal instance representations can be generated. Each temporal instance representation can be associated with differences in the appearance and motion of objects over past time intervals. Past paths and candidate paths of a set of objects can be determined based on the temporal instance representations and current detections of objects. Predicted paths of the set of objects using a machine-learned model trained that uses the past paths and candidate paths to determine the predicted paths. Past path data that includes information associated with the predicted paths can be generated for each object of the set of objects respectively.

20 Claims, 9 Drawing Sheets

Related U.S. Application Data on Nov. 16, 2019, provisional application No. 62/822,837, filed on Mar. 23, 2019.

(51) Int. Cl.
| | |
|---|---|
| *G01S 17/931* | (2020.01) |
| *B60W 60/00* | (2020.01) |
| *G05D 1/00* | (2006.01) |
| *G05D 1/02* | (2020.01) |
| *G01S 17/89* | (2020.01) |

(52) U.S. Cl.
CPC ......... *G05D 1/0088* (2013.01); *G05D 1/0221* (2013.01); *G06N 5/04* (2013.01); *G06N 20/00* (2019.01); *B60W 2420/52* (2013.01); *G05D 2201/0213* (2013.01)

(58) Field of Classification Search
CPC ......... G05D 1/0221; G05D 2201/0213; G06N 5/04; G06N 20/00; G06N 3/0445; G06N 3/0454; G06N 3/084; G06V 10/82; G06V 20/58

See application file for complete search history.

(56) References Cited

U.S. PATENT DOCUMENTS

| | | | |
|---|---|---|---|
| 2018/0348346 A1 | 6/2018 | Vallespi-Gonzalez et al. | |
| 2019/0049987 A1 | 2/2019 | Djuric et al. | |
| 2020/0272148 A1* | 8/2020 | Karasev | G05D 1/0088 |

OTHER PUBLICATIONS

International Preliminary Report on Patentability for Application No. PCT/US2020/024174, dated Oct. 7, 2021, 8 pages.
Alahi et al., "Social LSTM: Human Trajectory Prediction in Crowded Spaces", IEEE Conference on Computer Vision and Pattern Recognition (CVPR), Las Vegas, Nevada, pp. 961-971.
Ballan et al., "Knowledge Transfer for Scene-specific Motion Prediction", arXiv:1603.06987v2, Jul. 26, 2016, 17 pages.
Bansal et al., "ChauffeurNet: Learning to Drive by Imitating the Best and Synthesizing the Worst", arXiv:1812.03079v1, Dec. 7, 2018, 20 pages.
Casas et al., "IntentNet: Learning to Predict Intention from Raw Sensor Data", Conference on Robot Learning, PMLR, No. 87, Zurich, Switzerland, Oct. 29-31, pp. 1-10.
Chen et al., "3D Object Proposals for Accurate Object Class Detection", Twenty-ninth Conference on Neural Information Processing Systems, Dec. 7-12, 2015, Montreal, Canada, 9 pages.
Chen et al., "Monocular 3D Object Detection for Autonomous Driving", IEEE Conference on Computer Vision and Pattern Recognition, Jun. 26-Jul. 1, 2016, Nevada, Las Vegas pp. 2147-2156.
Chen et al., "Multi-View 3D Object Detection Network for Autonomous Driving", arXiv:1611.07759v3, Jun. 22, 2017, 9 pages.
Djuric et al., "Motion Prediction of Traffic Actors for Autonomous Driving using Deep Convolutional Networks", arXiv:1808.05819v1, Aug. 17, 2018, 10 pages.
Du et al., "A General Pipeline for 3D Detection of Vehicles", arXiv:1803.00387v1, Feb. 12, 2018, 7 pages.
Engelcke et al., "Vote3Deep: Fast Object Detection in 3D Point Clouds Using Efficient Convolutional Neural Networks", arXiv:1609.06666v2, Mar. 5, 2017, 7 pages.
Girshick, "Fast R-CNN", arXiv:1504.08083v2, Sep. 27, 2015, 9 pages.
Gupta et al., "Social GAN: Socially Acceptable Trajectories with Generative Adversarial Networks", arXiv:1803.10892v1, Mar. 29, 2018, 10 pages.
Hu et al., "Probabilistic Prediction of Vehicle Semantic Intention and Motion", arXiv:1804.03629v1, Apr. 10, 2018, 7 pages.
Kingma et al., "Adam: A Method for Stochastic Optimization", arXiv:1412.6980v1, Dec. 22, 2014, 9 pages.
Ku et al., "Joint 3D Proposal Generation and Object Detection from View Aggregation", arXiv:1712.02294v4, Jul. 12, 2018, 8 pages.
Lee et al., "DESIRE: Distant Future Prediction in Dynamic Scenes with Interacting Agents", arXiv:1704.04394v1, Apr. 14, 2017, 10 pages.
Li et al., "Vehicle Detection from 3D Lidar Using Fully Convolutional Network", arXiv:1608.07916v1, Aug. 29, 2016, 8 pages.
Li, "3D Fully Convolutional Network for Vehicle Detection in Point Cloud", arXiv:1611.08069v2, Jan. 16, 2017, 5 pages.
Liang et al, "Multi-Task Multi-Sensor Fusion for 3D Object Detection", IEEE Conference on Computer Vision and Pattern Recognition, Jun. 16-20, 2019, Long Beach, California, pp. 1-9.
Liang et al., "Deep Continuous Fusion for Multi-Sensor 3D Object Detection", European Conference on Computer Vision, Sep. 8-14, 2018, Munich, Germany, 16 pages.
Liang et al., "Peeking into the Future: Predicting Future Person Activities and Locations in Videos", arXiv:1902.03748v3, May 31, 2019, 13 pages.
Luo et al., "Fast and Furious: Real Time End-to-End 3D Detection, Tracking and Motion Forecasting with a Single Convolutional Net", IEEE Conference on Computer Vision and Pattern Recognition, Jun. 18-21, 2018, Salt Lake City, Utah, pp. 3569-3577.
Ma et al., "Forecasting Interactive Dynamics of Pedestrians with Fictitious Play", arXiv:1604.01431v3, Mar. 28, 2017, 9 pages.
Qi, "Frustum PointNets for 3D Object Detection from RGB-D Data", arXiv:1711.08488v2, Apr. 13, 2018, 15 pages.
Ronneberger et al., "U-Net: Convolutional Networks for Biomedical Image Segmentation", arXiv:1505.04597v1, May 18, 2015, 8 pages.
Song et al., "Joint SFM and Detection Cues for Monocular 3D Localization in Road Scenes", IEEE Conference on Computer Vision and Pattern Recognition (CVPR), Jun. 7-12, 2015, Boston, Massachusetts , pp. 3734-3742.
Soo Park et al., "Egocentric Future Localization", IEEE Conference on Computer Vision and Pattern Recognition (CVPR), Jun. 27-30, 2016, Las Vegas Nevada, 9 pages.
Xiang et al., "Data-Driven 3D Voxel Patterns for Object Category Recognition", IEEE Conference on Computer Vision and Pattern Recognition (CVPR), Jun. 8-10, 2015, Boston, Massachusetts, 33 pages.
Xu et al., "PointFusion: Deep Sensor Fusion for 3D Bounding Box Estimation", arXiv:1711.10871v2, Aug. 25, 2018, 11 pages.
Yan et al., "SECOND: Sparsely Embedded Convolutional Detection", Sensors, vol. 18, Oct. 6, 2018, pp. 1-17.
Yang et al., "HDNET: Exploiting HD Maps for 3D Object Detection", Conference on Robot Learning, Oct. 29-31, 2018, Zurich, Switzerland, 10 pages.
Yang et al., "PIXOR: Real-time 3D Object Detection from Point Clouds", IEEE Conference on Computer Vision and Pattern Recognition (CVPR), Jun. 18-22, 2018, Salt Lake City, Utah, pp. 7652-7660.
Zeng et al., "End-to-end Interpretable Neural Motion Planner", IEEE Conference on Computer Vision and Pattern Recognition (CVPR), Jun. 16-20, 2019, Long Beach, California, pp. 8660-8669.
Zhou et al., "VoxelNet: End-to-End Learning for Point Cloud Based 3D Object Detection", IEEE Conference on Computer Vision and Pattern Recognition (CVPR), Jun. 18-22, 2018, Salt Lake City, Utah, 10 pages.

* cited by examiner

PERCEPTION AND MOTION PREDICTION FOR AUTONOMOUS DEVICES

RELATED APPLICATION

The present application is based on and claims benefit of U.S. Provisional Patent Application No. 62/822,837 having a filing date of Mar. 23, 2019; U.S. Provisional Patent Application No. 62/936,423 having a filing date of Nov. 16, 2019; and U.S. Provisional Patent Application No. 62/942,380 having a filing date of Dec. 2, 2019, which are incorporated by reference herein.

FIELD

The present disclosure relates generally to determining the state of objects and predicting their motion through an environment.

BACKGROUND

Vehicles, including autonomous vehicles, can receive data that is used to determine the state of an environment through which the vehicle travels. This data can be associated with various representations of the environment including objects that are present in the environment. As the state of the environment is dynamic, and the objects that are present in the environment can change over time, operation of a vehicle may rely on an accurate determination of the state of the representations of the environment over time.

SUMMARY

Aspects and advantages of embodiments of the present disclosure will be set forth in part in the following description, or may be learned from the description, or may be learned through practice of the embodiments.

An example aspect of the present disclosure is directed to a computer-implemented method of perception and motion forecasting. The computer-implemented method can include generating, by a computing system including one or more computing devices, a plurality of temporal instance representations. Each temporal instance representation can be associated with differences in an appearance and a motion of one or more objects over past time intervals. The method can include determining, by the computing system, based at least in part on the plurality of temporal instance representations and current detections of a set of objects including the one or more objects, one or more past paths of the one or more objects over the past time intervals and one or more candidate paths of the set of objects over a set of time intervals including a current time interval and at least one of the past time intervals. The method can include determining, by the computing system, one or more predicted paths of the set of objects based at least in part on one or more machine-learned models. The one or more machine-learned models can utilize the one or more past paths and the one or more candidate paths to infer the one or more predicted paths. Furthermore, the method can include generating, by the computing system, path data including information associated with the one or more predicted paths for each object of the set of objects respectively.

Another example aspect of the present disclosure is directed to a computing system including: one or more processors; a memory including one or more computer-readable media, the memory storing computer-readable instructions that when executed by the one or more processors cause the one or more processors to perform operations. The operations can include generating a plurality of temporal instance representations. Each temporal instance representation can be associated with differences in an appearance and a motion of one or more objects over past time intervals. The operations can include determining, based at least in part on the plurality of temporal instance representations and current detections of a set of objects including the one or more objects, one or more past paths of the one or more objects over the past time intervals and one or more candidate paths of the set of objects over a set of time intervals including a current time interval and at least one of the past time intervals. The operations can include determining one or more predicted paths of the set of objects based at least in part on one or more machine-learned models. The one or more machine-learned models can utilize the one or more past paths and the one or more candidate paths to infer the one or more predicted paths. Furthermore, the operations can include generating path data including information associated with the one or more predicted paths for each object of the set of objects respectively.

Another example aspect of the present disclosure is directed to an autonomous vehicle including: one or more processors; a memory including one or more computer-readable media, the memory storing computer-readable instructions that when executed by the one or more processors cause the one or more processors to perform operations. The operations can include generating a plurality of temporal instance representations. Each temporal instance representation can be associated with differences in an appearance and a motion of one or more objects over past time intervals. The operations can include determining, based at least in part on the plurality of temporal instance representations and current detections of a set of objects including the one or more objects, one or more past paths of the one or more objects over the past time intervals and one or more candidate paths of the set of objects over a set of time intervals including a current time interval and at least one of the past time intervals. The operations can include determining one or more predicted paths of the set of objects based at least in part on one or more machine-learned models. The one or more machine-learned models can utilize the one or more past paths and the one or more candidate paths to infer the one or more predicted paths. Furthermore, the operations can include generating path data including information associated with the one or more predicted paths for each object of the set of objects respectively.

Other example aspects of the present disclosure are directed to other systems, methods, vehicles, apparatuses, tangible non-transitory computer-readable media, and devices for perception and motion forecasting.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
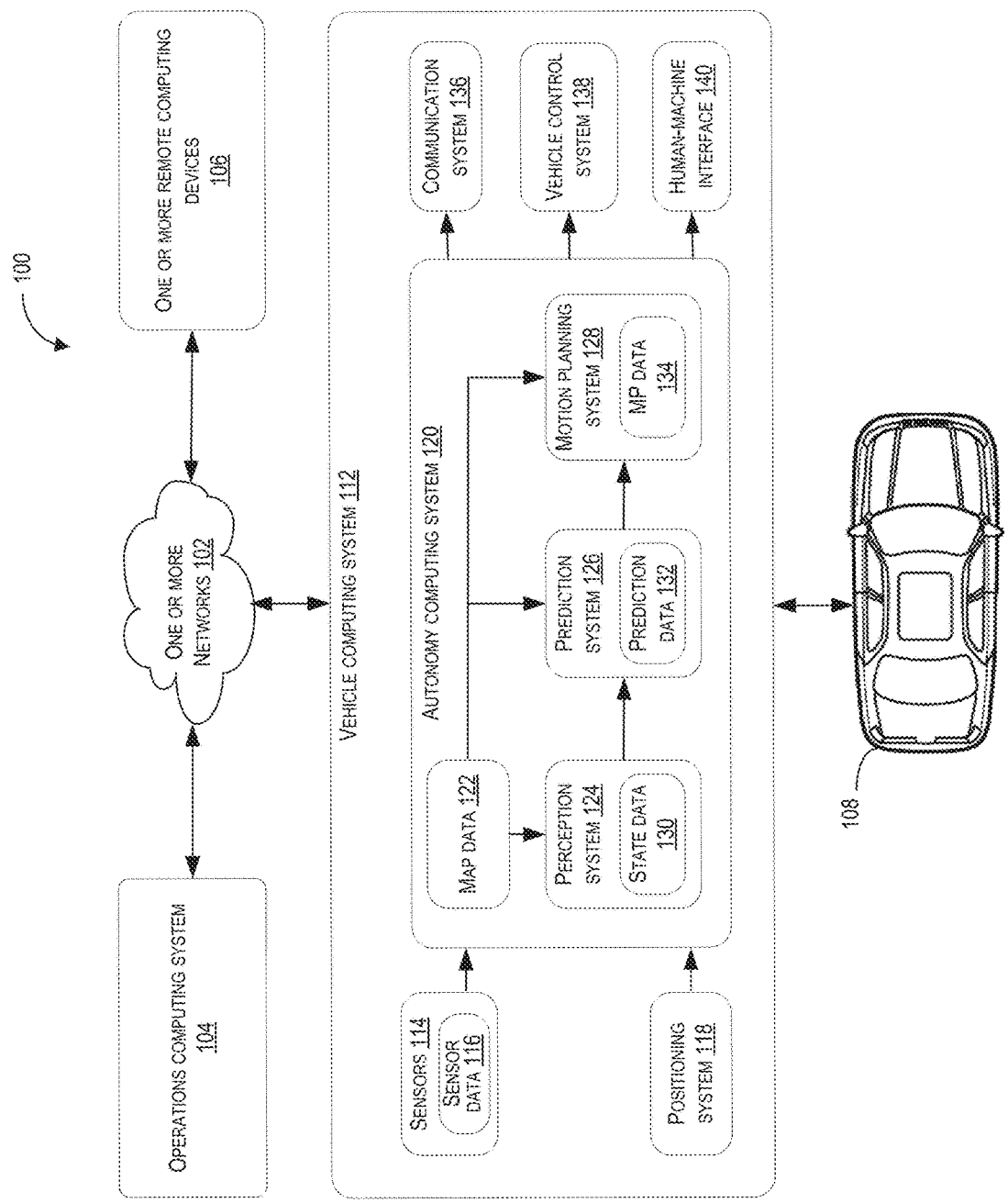
FIG. 1 depicts a diagram of an example system according to example embodiments of the present disclosure.

Example aspects of the present disclosure are directed to predicting the motion of objects in an environment. In particular, the disclosed technology can use information associated with changes in the motion and appearance of objects to predict their path and/or trajectory over a set of future time intervals. Further, the disclosed technology can improve the accuracy of the predictions by using one or more machine-learned models that are configured to predict paths and/or trajectories for currently detected objects based on changes in the appearance and motion of the objects over time.

By way of example, the predictions (e.g., forecasts) generated by the disclosed technology can be used in a variety of ways, including as an input to a motion planning system of an autonomous device, such as an autonomous vehicle. Further, the predictions of an object's path and/or trajectory can be accompanied by confidence scores that various autonomous vehicle systems can use when determining which predicted paths or trajectories are most likely to be correct. In this way, the predicted paths of detected objects can be used to create more accurate motion plans for an autonomous vehicle, thereby resulting in improved vehicle safety and more effective vehicle operation.

The disclosed technology can be implemented as a computing system (e.g., a motion prediction computing system) that is configured to access a variety of data including multi-sensor data associated with previously detected objects. The multi-sensor data can be based on a set of inputs including light detection and ranging (LiDAR) sweep data, camera images, and map data that indicates the position of objects from a bird's eye perspective. The multi-sensor data can then be used to create temporal instance representations and/or trajectory level representations associated with the appearance and motion of the previously detected objects. For example, each temporal instance representation or trajectory level representation can include information associated with appearance features of the previously detected objects including the shape and/or physical dimensions of each previously detected object. Further, each temporal instance representation and/or trajectory level representation can also include information associated with motion features of the previously detected objects including the velocity and/or acceleration of each previously detected object.

Using the temporal instance representations and current detections of objects including the previously detected objects, the motion prediction computing system can determine past paths of the previously detected objects and a set of candidate paths that additionally includes the currently detected objects. For example, the past paths can be based at least in part on the temporal instance representations including a set of locations at which the previously detected object were located in the past. Further, the candidate paths can be determined based at least in part on the temporal instance representations and current detections of the objects including the current state of the respective objects. The motion prediction computing system can then use machine-learned models to determine predicted paths for the detected objects.

Furthermore, the motion prediction computing system can generate output including path data that is associated with the predicted paths of the objects. This path data can, in some implementations, be formatted for use in a variety of applications including uses associated with the operation of an autonomous vehicle (e.g., generating a motion plan for an autonomous vehicle based at least in part on the path data).

Accordingly, the disclosed technology can increase the accuracy and precision with which the motion of objects can be predicted. This increase in the accuracy and precision of predicted motion can allow for a host of improvements in the operation of a vehicle and other systems that can benefit from the use of predicted paths for objects.

As described above, in certain implementations the motion prediction computing system can generate a plurality of temporal instance representations. Each temporal instance representation can be associated with one or more differences in an appearance and/or motion of one or more objects over past time intervals. For example, the plurality of temporal instance representations can include data and/or information associated with the visual features (e.g., shape, color, and/or texture of each of the one or more objects) and motion features (e.g., velocity, acceleration, orientation, and/or location over time of each of the one or more objects).

In some embodiments, each of the plurality of temporal instance representations can include one or more appearance features of each of the one or more objects at each of the past time intervals and/or one or more motion features of each of the one or more objects at each of the past time intervals. The one or more appearance features can include colors, intensities, textures, and/or edges of each of the one or more objects. Further, the one or more motion features can include one or more locations of each of the one or more objects; the velocity of each of the one or more objects; the acceleration of each of the one or more objects; and/or one or more headings, orientations, or bearings of each of the one or more objects.

In some embodiments, the one or more appearance features of each object per past time interval can be represented by $f_{app}$ and can be associated with the equation $f_{app}$=LinearInterp(F, (x, y)), in which each of the one or more appearance features is based at least in part on a linear interpolation (LinearInterp) of features F at the two-dimensional location (x, y).

In some embodiments, the one or more motion features of each object per past time interval can be represented by $f_{motion}$ and can be associated with the equation $f_{motion}$=(Δx+Δu, Δy+Δv, Δu, v, sin Δθ+cos Δθ), in which each of the one or more motion features is based at least in part on differences Δ of: the two-dimensional location of an object x,y; the ego vehicle position u,v; and the heading angle θ.

In some embodiments, each temporal instance representation can include a concatenation of one or more appearance features and one or more motion features respectively associated with the appearance and the motion of the one or more objects over the past time intervals. For example, each temporal instance representation can include information associated with both the one or more appearance features and the one or more motion features at each time interval.

In some embodiments, the temporal instance representation including the concatenation of the one or more appearance features and the one or more motion features can be expressed as $$f = w\left(\underset{t=t_0,\ldots,t_1}{Concat}\left[f_{app}^t, f_{motion}^t\right]\right).$$

The w parameter can be a feature extractor that can be associated with a one-dimensional neural network that uses an input including the concatenation of the one or more appearance features $f_{app}^t$ and the one or more motion features $f_{motion}^t$ over the plurality of past time intervals t.

In some embodiments, generating a plurality of temporal instance representations can include generating a plurality of feature maps associated with the appearance and/or the motion of the one or more objects over the one or more past time intervals. The plurality of feature maps can be based at least in part on a plurality of machine-learned feature extraction models and multi-sensor data. Further, the plurality of temporal instance representations can be based at least in part on the plurality of feature maps. For example, multi-sensor data that includes data from a set of sensors including cameras, LiDAR devices, and map data can be used as an input to a plurality of machine-learned feature extraction models that have been configured and/or trained to generate a plurality of feature maps based at least in part on the input. The temporal instance representations can then be based at least in part on the plurality of feature maps that were generated by the plurality of machine-learned feature extraction models.

The multi-sensor data can be based at least in part on sensor outputs from a plurality of different types of sensors. Further, the multi-sensor data can include one or more LiDAR sweeps, map data that can include information associated with one or more locations (e.g., latitude, longitude, and/or altitude) in an environment (e.g., a geographic area) that can include the one or more objects, and/or one or more images (e.g., visual images from a camera) that can include the one or more objects. In some embodiments, the map data can include a bird's eye view (e.g., a top-down view of the environment from above) of the environment including the one or more objects.

In some embodiments, generating the plurality of temporal instance representations can include accessing, obtaining, receiving, and/or retrieving data associated with the motion of the one or more objects over the past time intervals from an object path memory. For example, the data associated with the motion of the one or more objects over the past time intervals can be stored in an object path memory that includes information associated with one or more locations and/or one or more headings of each of the one or more objects over the past time intervals. The object path memory can include two-dimensional object locations including: coordinates (e.g., Bird's eye view coordinates) of each object relative to a point of reference (e.g., a vehicle); a latitude and longitude of each object; and/or heading angles for each object relative to the point of reference.

Further, generating the plurality of temporal instance representations can include accessing, obtaining, receiving, and/or retrieving data associated with the appearance of the one or more objects over the past time intervals from an appearance memory that can be different from the object path memory. The data associated with the appearance of the one or more objects over the past time intervals can be stored in an appearance memory that includes information associated with one or more appearance feature maps associated with appearance features of each of the one or more objects over the past time intervals.

The motion prediction computing system can determine one or more past paths of the one or more objects over the past time intervals and/or one or more candidate paths of the set of objects over a set of time intervals that can include a current time interval and at least one of the past time intervals. The determination of the one or more past paths and/or the one or more candidate paths can be based at least in part on the plurality of temporal instance representations and/or current detections of a set of objects that can include the one or more objects. For example, the plurality of temporal instance representations can be used to determine the one or more past paths based at least in part on the past locations of the one or more objects. Further, the one or more candidate paths can be based at least in part on the temporal instance representations and current detections that include the state of the one or more objects that were previously detected as well as the state of any newly detected objects.

In some embodiments, determining one or more past paths and/or one or more candidate paths can include determining, based at least in part on one or more comparisons of the set of objects to the one or more objects, whether the set of objects includes one or more newly detected objects not included in the one or more objects from the past time intervals. For example, the number or amount of objects in the set of objects can be compared to the respective number or amount of the one or more objects from the past time intervals. The objects in the set of objects that were not in the one or more objects from the past time intervals can be determined to be newly detected objects.

In some embodiments, the one or more past paths can include at least one null path. Further, in some embodiments, determining one or more past paths and/or one or more candidate paths can include associating the one or more newly detected objects with the at least one null path. For example, the one or more past paths can be associated with the one or more (actual) past paths of the one or more objects and the null path can be a type of path without any associated locations or objects that can be associated with newly detected objects that were not associated with the past paths.

In some embodiments, a number of the one or more candidate paths can be at least as great as a combination of a number of the one or more past paths and a number of the current detections of the set of objects. For example, when there are three past paths (e.g., one path per object) and three current detections of the three objects associated with the three past paths, there can be at least three candidate paths (e.g., one candidate path for each object).

The motion prediction computing system can determine one or more predicted paths of the set of objects based at least in part on one or more machine-learned models. The one or more machine-learned models can be configured and/or trained to utilize the one or more past paths and/or the one or more candidate paths to infer the one or more predicted paths. For example, the one or more machine-learned models can be configured and/or trained to generate an output including the one or more predicted paths based at least in part on an input including the one or more past paths and/or the one or more candidate paths. The one or more machine-learned models can include any combination of a convolutional neural network, a recurrent neural network, a recursive neural network, a decision tree, logistic regression model, and/or a support vector machine.

In some embodiments, determining the one or more predicted paths of the set of objects can include determining a plurality of matching scores corresponding to the plurality of temporal instance representations. Each of the plurality of matching scores can be based at least in part on one or more differences between the appearance and the motion of the set of objects over the one or more past paths and/or the appearance and the motion of the set of objects over the one or more candidate paths. In some embodiments, each matching score of the plurality of matching scores can be inversely proportional to one or more differences in appearance and/or motion of an object over a past path and a candidate path. For example, higher matching scores can be associated with a smaller number of differences (e.g., a smaller number of visual features that are different) and/or a lower magnitude of differences (e.g., a smaller difference in velocity) in appearance and/or motion. Conversely, lower matching scores can be associated with a greater number of differences and/or a greater magnitude of differences in appearance and/or motion.

In some embodiments, each of the plurality of matching scores can be based at least in part on the matching function MatchScore=MLPmatch($f_1(O^{t-1})f_2(d)$) in which a multi-layer perceptron MLPmatch uses an input that includes a concatenation of the temporal instance representations $f_1$ and $f_2$.

In some embodiments, each of the plurality of matching scores can be associated with past paths and can be based at least in part on evaluation of the past path proposal function $$k = \underset{i=0,\ldots,M}{\mathrm{argmax}}\ MatchScore(O_i^{t-1}, d).$$

In the past path proposal function, the past path proposal k can be based at least in part on maximizing the matching score (MatchScore) associated with each past object path $O^{t-1}$ and each voxel candidate $d_i$ over the past time intervals t.

In some embodiments, each of the plurality of matching scores can be associated with current detections and can be based at least in part on evaluation of the new path proposal function $$k = \underset{i=0,\ldots,M}{\mathrm{argmax}}\ MatchScore(O^{t-1}, d_i).$$

In the new path proposal function, the new path proposal k can be based at least in part on maximizing the matching score (MatchScore) associated with each past object path $O_i^{t-1}$ and each detection d (e.g., Bird's eye view detection) over the past time intervals t.

In some embodiments, determining the one or more predicted paths of the set of objects can include determining the one or more predicted paths based at least in part on the plurality of matching scores associated with a least amount of difference in the appearance and the motion of the set of objects. For example, when two matching scores are associated with the same object, the predicted path can be determined to be associated with the matching score that is associated with fewer differences in the appearance and motion of the object (e.g., the higher matching score of the two matching scores).

In some embodiments, determining the one or more predicted paths of the set of objects can include determining, for the one or more candidate paths, and based at least in part on the plurality of temporal instance representations and the one or more machine-learned models that can include a machine-learned refinement model, one or more confidence scores, one or more path refinements, and/or one or more candidate predicted paths. The one or more machine-learned models can include a machine-learned refinement model that is trained and/or configured to generate an output including the one or more confidence scores, one or more path refinements, and/or one or more candidate predicted paths based at least in part on an input including the plurality of temporal instance representations. In some embodiments, the predicted path can be selected from or based at least in part on one of the one or more candidate predicted paths. In some embodiments, the one or more confidence scores can be associated with a confidence in each of the one or more candidate predicted paths.

Further, any of the one or more confidence scores (associated with a confidence in each of the one or more candidate predicted paths) can be associated with one or more probability distributions. A probability distribution for the one or more confidence scores can be associated with one or more probabilities of any set of the one or more candidate predicted paths being accurate (e.g., a first predicted path that is close (in terms of distance) to the path an object will actually follow in the future is more accurate than a second predicted path that is further away (than the first predicted path) from the actual path the object will follow). For example, in a Gaussian distribution associated with the one or more confidence scores, the one or more candidate predicted paths that are most probable can be clustered around the region that is within one standard deviation of the mean of the probability distribution, while the least probable of the one or more candidate predicted paths can be associated with outliers two or more standard deviations from the mean.

The one or more confidence scores can be sent to and/or accessed by any system that uses the one or more candidate predicted paths. For example, a motion planning system of an autonomous vehicle can use the one or more confidence scores when generating a motion plan for the autonomous vehicle. By using the one or more candidate predicted paths associated with higher confidence scores, the motion planning system is more likely to generate a motion plan that is more safe and less likely to result in the need for sudden braking or course correction.

Further, determining the one or more predicted paths of the set of objects can include generating one or more refined candidate paths based at least in part on the one or more candidate predicted paths and the one or more path refinements. For example, the one or more path refinements can be applied to each of the one or more candidate predicted paths respectively. The one or more path refinements can, for example, modify the orientation of the object associated with each time interval of the respective candidate predicted path.

Further, determining the one or more predicted paths of the set of objects can include ranking the one or more refined candidate paths based at least in part on the one or more confidence scores. For example, the one or more refined paths can be ranked in an order corresponding to their respective confidence scores.

The one or more confidence scores can be associated with a respective estimated accuracy of the one or more candidate predicted paths. The one or more path refinements can include adjustments (e.g., changing the size and/or shape) of bounding boxes associated with the appearance of each object of the set of objects along the one or more candidate paths.

The motion prediction computing system can determine the one or more predicted paths based at least in part on the ranking of the one or more refined candidate paths. For example, the one or more predicted paths can be associated with the respective one or more refined candidate paths that are most highly ranked (e.g., ranked first).

In some embodiments, each of the one or more confidence scores, the one or more path refinements, and the one or more candidate predicted paths can be based at least in part on the associated temporal instance representation and can be expressed as conf, refine, pred=MLP$_{out}$(f$_3$($\tilde{O}$ $^t$) in which a multi-layer perceptron MLP uses the temporal instance representation f$_3$ to generate the confidence score miff, the path refinement refine, and the candidate predicted path pred for each path proposal $\tilde{O}$ $^t$. Further, each path refinement can be based at least in part on evaluation of $O$ $^t$=$\tilde{O}$ $^t$⊕ refine, in which the operator ⊕ can be used to apply a bounding box refinement to each of the one or more candidate predicted paths at each time interval.

In some embodiments, the one or more machine-learned models can be configured and/or trained to respectively compare the appearance and the motion of the set of objects along the one or more past paths at each of the past time intervals to the appearance and the motion of the set of objects along the one or more candidate paths at each of the past time intervals. For example, the one or more machine-learned models can be configured and/or trained to generate output including the one or more predicted paths based at least in part on input including feature maps associated with the appearance and/or motion of the set of objects.

In some embodiments, the one or more machine-learned models can be trained based at least in part on minimization of a loss associated with one or more differences between one or more predicted training paths and one or more ground-truth paths. For example, the one or more machine-learned models can be trained using a loss function that is evaluated to determine the loss based on the one or more differences (e.g., difference in the appearance and/or motion of objects along the one or more predicted training paths) between the one or more predicted training paths and the one or more ground-truth paths.

The one or more predicted training paths can be generated using training data and the one or more machine-learned models. Further, the training data can include a plurality of training temporal instance representations and a plurality of training object detections. For example, the one or more predicted training paths can be generated based at least in part on providing an input including the plurality of training temporal instance representations and the plurality of training object detections into one or more machine-learned models configured and/or trained to generate the one or more predicted training paths based at least in part on the input.

In some embodiments, the loss can be based at least in part on a total loss function $L_{total}=(L_{det}+L_{match})+(L_{conf}+L_{refine}+L_{pred})$ associated with a detection loss $L_{det}$ (e.g., a loss associated with evaluation of a loss function including parameters associated with the accuracy of detecting objects), a matching loss $L_{match}$ (e.g., a loss associated with evaluation of a loss function including parameters associated with the accuracy of matching past paths to candidate paths), a confidence score loss $L_{conf}$ (e.g., a loss associated with evaluation of a loss function including parameters associated with maximizing confidence scores), a refinement loss $L_{refine}$ (e.g., a loss associated with evaluation of a loss function including parameters associated with improving path refinement accuracy), and/or a prediction loss $L_{pred}$ (e.g., a loss associated with evaluation of a loss function including parameters associated with increasing prediction accuracy).

In some embodiments, the matching loss $L_{match}$ can be defined as $$L_{match} = \sum_{(i,j)} \max(0, m - (s_i - s_j))n$$

which $s_i$ is the matching score for the i$^{th}$ positive match, and $s_j$ is the matching score for the j$^{th}$ negative match, and m is the margin threshold.

Further, the loss can be inversely correlated with similarity of the one or more predicted training paths relative to the one or more ground-truth paths. For example, a greater loss can correspond to less similarity between the one or more predicted training paths and the one or more ground-truth paths. By way of further example, a lower loss can correspond to greater similarity between the one or more predicted training paths and the one or more ground-truth paths.

In some embodiments, the one or more machine-learned models can be trained through a process of end-to-end learning. For example, the one or more machine-learned models can include a pipeline that is comprised of a set of machine-learned models that sequentially perform different operations associated with generating predicted trajectories for detected objects. Each machine-learned model in the pipeline can receive inputs associated with object appearance and/or motion and can generate output that is then provided as an input to the next machine-learned model which generates an output that is provided to the next machine-learned model that continues the process of receiving input and generating output until the last machine-learned model in the pipeline. Further, constituent functions of the machine-learned models can be differentiable and backpropagation can be used as part of the process of training the set of machine-learned models in the pipeline from end-to-end.

In some embodiments, the one or more machine-learned models can be trained based at least in part on minimization of a loss associated with one or more differences between one or more predicted training trajectories and one or more ground-truth trajectories. For example, the one or more machine-learned models can be trained using a loss function that is evaluated to determine the loss based on the one or more differences (e.g., difference in the appearance and/or motion of objects along the one or more predicted training trajectories) between the one or more predicted training trajectories and the one or more ground-truth trajectories.

The one or more predicted trajectories can be generated using training data and the one or more machine-learned models. Further, the training data can include a plurality of training trajectory level representations and a plurality of training object detections. For example, the one or more predicted training trajectories can be generated based at least in part on providing an input including the plurality of training trajectory level representations and the plurality of training object detections into one or more machine-learned models configured and/or trained to generate the one or more predicted trajectories based at least in part on the input.

In some embodiments, the loss can be a multi-task loss of detection, tracking, and prediction that is based at least in part on the multi-task loss function $l=l_{det}+l_{track}+l_{predict}$ in which the total loss is based at least in part on a detection loss $l_{det}$ (e.g., a loss associated with evaluation of a loss function including parameters associated with the accuracy of detecting objects), a tracking loss $l_{track}$ (e.g., a loss associated with evaluation of a loss function including parameters associated with tracking objects over time), and/or a prediction loss $l_{predict}$ (e.g., a loss associated with evaluation of a loss function including parameters associated with increasing prediction accuracy).

In some embodiments, the tracking loss $l_{track}$ can be defined as $l_{track}=l_{score}^{affinity}+l_{score}^{sot}+l_{score}^{refine}+l_{reg}^{refine}$, in which $l_{score}^{affinity}$ can be the associated with the loss of each object association (e.g., association of a detected object with an object track), $l_{score}^{sot}$ can be associated with single object tracking (SOT) predictions, $l_{score}^{refine}$ can be associated with refinement of bounding shapes (e.g., bounding boxes) associated with each object, and $l_{reg}^{refine}$ be associated with a refinement regularization term.

Further, the one or more machine-learned models can be trained based at least in part on minimization of a loss associated with a trajectory score. The loss associated with a trajectory score can be expressed as $$\ell_{score} = \frac{1}{N_{i,j}} \sum_{(i \in pos, j \in neg)} \max(0, m - (a_i - a_j))$$

which $a_i$ is the score of the i-th positive sample (e.g., a detected object that is associated with a track), $a_1$ is the score for the j-th negative sample (e.g., a detected object that is not associated with a track), m is the margin threshold, and $N_{i,j}$ is the number of all positive-negative pairs.

Further, the loss can be inversely correlated with similarity of the one or more predicted training trajectories relative to the one or more ground-truth trajectories. For example, a greater loss can correspond to less similarity between the one or more predicted training trajectories and the one or more ground-truth trajectories. By way of further example, a lower loss can correspond to greater similarity between the one or more predicted trajectories and the one or more ground-truth trajectories.

The motion prediction computing system can generate data that can include path data. The path data can include information associated with the one or more predicted paths for each object of the set of objects respectively. For example, the path data can include a set of locations that each object of the set of objects is predicted to travel to at a respective set of future time intervals. Further, the path data can be generated in a format that can be used as an input to various computing systems including the autonomy system of an autonomous vehicle.

In some embodiments, the path data can be part of an input to a motion planning system of the autonomous vehicle. For example, the motion planning system of an autonomous vehicle can be configured to receive the path data as an input that is used to provide predicted paths of objects that can be used to as part of a motion plan for the autonomous vehicle.

In some embodiments, one or more vehicle systems of an autonomous device (e.g., an autonomous vehicle) can be controlled based at least in part on the path data. An autonomous device can generate one or more signals associated with the path data that are then sent to various vehicle systems and/or vehicle components. The one or more signals associated with the path data can be used to control, operate, and/or activate the vehicle systems and/or vehicle components. For example, a motion planning system of an autonomous vehicle can use the path data to determine the time and location at which the autonomous vehicle will come to a stop and will control the braking system of the autonomous vehicle to bring the autonomous vehicle to a stop at the determined time and location.

The disclosed technology can be implemented by a variety of systems that predict the paths of objects based on the detection and tracking of those objects in an environment. In particular, the disclosed technology can be used as part of a vehicle (e.g., an autonomous vehicle) that more accurately predicts the future path of objects, and in turn initiates an appropriate response based on the path the object is predicted to follow. For example, an autonomous vehicle that accurately predicts the path of other vehicles can navigate the environment with a greater level of safety. Further, more effective path prediction can result in a smoother ride and greater passenger comfort.

Furthermore, the disclosed technology can include a computing system that is configured to perform various operations associated with predicting the motion of objects in an environment. In some embodiments, the computing system can be associated with the autonomy system of an autonomous vehicle which can include a perception system, a prediction system, and/or a motion planning system. Furthermore, the computing system can process, generate, modify, and/or access (e.g., send, and/or receive) data and/or information including data and/or information associated with the prediction of object motion and/or control of the autonomy system of the autonomous vehicle. By way of example, in a busy environment filled with a variety of objects (e.g., vehicles, cyclists, and pedestrians), the computing system can use multi-sensor data from various sensors to determine the path of the objects. The motion prediction computing system can then generate control signals that are used to control various vehicle systems (e.g., sensors, autonomy system, and/or motion control systems)

so that the vehicle can perform actions including generating a motion plan that is used as a basis for guiding the vehicle through an environment.

The systems, methods, devices, and non-transitory computer-readable media in the disclosed technology can provide a variety of technical effects and benefits including improving the accuracy of predicting paths in general and improving the overall operation of a vehicle that uses motion plans based on predicted paths in particular. By more effectively predicting the motion of objects through use of one or more machine-learned models, the disclosed technology can provide various benefits including more accurate motion prediction, improvement in the utilization of computational resources, improved scalability, reduced wear and tear on a vehicle, greater fuel efficiency, and improved safety.

The disclosed technology can achieve more accurate and/or faster motion prediction by leveraging the use of one or more machine-learned models that are trained to more effectively predict object motion. Further, the one or more machine-learned models can be trained to predict motion based on a mix of inputs including multi-sensor data that includes LiDAR data, image data, and map data. The trained machine-learned models can be optimized to perform the task of predicting object motion more efficiently. Accordingly, the disclosed technology can more effectively utilize computational resources by reducing the number of operations that need to be performed to accurately predict the motion of objects.

Furthermore, by using the one or more machine-learned models, the disclosed technology has the additional advantage of improved scalability. In particular, a machine-learned model that can be retrained using an additional set of training data can be improved without the laborious manual derivations and adjustments that are often required in rules-based models or heuristic models that do not use machine-learning. For example, in a manually derived rules based model, a human designer may manually derive heuristic models that determine the way in which motion can be predicted including manually weighting parameters associated with various appearance and motion features. As such, the task of crafting and adjusting a heuristic model can be onerous relative to using a machine-learned model that is trained using training datasets. Further, the one or more machine-learned models in the disclosed technology can be trained using relevant training data including multi-sensor data, which can be done on a large scale that can use millions of images, LiDAR sweeps, and maps of different geographic areas. Additionally, the one or more machine-learned models can be readily revised as new training data becomes available or new uses for the one or more machine-learned models are envisioned.

The disclosed technology can also improve the operation of a vehicle by reducing the amount of wear and tear on vehicle components through more gradual adjustments in the vehicle's travel path that can be performed based on the more predicted paths of objects in the environment surrounding the vehicle. For example, more accurate motion prediction can result in a safer and smoother ride including a reduction in sudden stops and sharp turns that impose excessive strain on a vehicle's engine, braking, and steering systems. Additionally, more accurate motion prediction has the added benefit of improving the comfort of passengers when the vehicle is in transit due to smoother adjustments by the vehicle that result from more accurate motion prediction.

The disclosed technology can further improve the operation of a vehicle by improving the energy efficiency of the vehicle. For example, more accurate motion prediction can result in more efficient navigation of a vehicle through an environment, thereby reducing the number of fuel consuming course changes and achieving a reduction in the overall amount of energy including the fuel or battery power consumed during operation of the vehicle.

Additionally, more effective motion prediction can allow for an improvement in safety for passengers inside a vehicle as well as individuals outside the vehicle including pedestrians, cyclists, and/or passengers of other vehicles. For example, the more accurate predicted paths generated by the disclosed technology can be used by an autonomous vehicle's motion planning system to more effectively avoid unintentional contact with objects outside the vehicle.

Accordingly, the disclosed technology provides a host of improvements to the prediction of object motion and the overall operation of associated devices in general. In particular, the improvements offered by the disclosed technology result in tangible benefits to a variety of systems including the mechanical, electronic, and computing systems of autonomous devices (e.g., autonomous vehicles).

With reference now to FIGS. 1-9, example embodiments of the present disclosure will be discussed in further detail. FIG. 1 depicts a diagram of an example system 100 according to example embodiments of the present disclosure. As illustrated, FIG. 1 shows a system 100 that includes a communications network 102; an operations computing system 104; one or more remote computing devices 106; a vehicle 108; a vehicle computing system 112; one or more sensors 114; sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140.

The operations computing system 104 can be associated with a service provider that can provide one or more services to a plurality of users via a fleet of vehicles that can include, for example, the vehicle 108. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the vehicle 108. The one or more computing devices of the operations computing system 104 can include one or more processors and one or more memory devices. The one or more memory devices of the operations computing system 104 can store instructions that when executed by the one or more processors cause the one or more processors to perform one or more operations and/or functions including any of the operations and/or functions of the one or more remote computing devices 106 and/or the vehicle computing system 112. Furthermore, the operations computing system 104 can perform one or more operations and/or functions including operations associated with generating temporal instance representations and/or trajectory level representations based on the appearance and motion of objects over a plurality of time intervals; using the temporal instance representations as well as current detections of the objects to determine the past paths and candidate paths for the objects; predicting paths of the objects based on the use of machine-learned models trained to receive the past paths and candidate paths as an input and generate the predicted paths as an output; and/or generating path data including the predicted paths for each of the objects. In some embodiments, the operations computing system 104 can use the trajectory level representations to determine one or more predicted trajectories of the objects.

Furthermore, the one or more memory devices of the operations computing system 104 can store data including instructions used to implement one or more machine-learned models that have been configured and/or trained to generate an output based at least in part on an input provided to the one or more machine-learned models. For example, the one or more machine-learned models stored in the one or more memory devices of the operations computing system 104 can include one or more convolutional neural networks, one or more residual convolutional neural networks, one or more recurrent neural networks, and/or one or more recursive neural networks. Further, the one or more machine-learned models stored in the one or more memory devices of the operations computing system 104 can include one or more machine-learned models, that are described herein.

Furthermore, the operations computing system 104 can be configured to monitor and communicate with the vehicle 108 and/or its users to coordinate a vehicle service provided by the vehicle 108. To do so, the operations computing system 104 can manage a database that includes data including state data associated with the state of one or more objects including one or more objects external to the vehicle 108. The state data can include a location of an object (e.g., a latitude, longitude, and/or altitude of an object detected by the one or more sensors 114 of the vehicle 108), the state of a vehicle (e.g., the velocity, acceleration, heading, position, and/or location of the vehicle 108), and/or the state of objects external to a vehicle (e.g., the physical dimensions, velocity, acceleration, heading, shape, sound, and/or appearance of objects external to the vehicle). In some embodiments, the state data can include one or more portions of the sensor data that is described herein.

The operations computing system 104 can communicate with the one or more remote computing devices 106 and/or the vehicle 108 via one or more communications networks including the communications network 102. The communications network 102 can send and/or receive signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 102 can include a local area network (e.g. intranet), wide area network (e.g. Internet), wireless LAN network (e.g., via Wi-Fi), cellular network, a SATCOM network, VHF network, a I-IF network, a WiMAX based network, and/or any other suitable communications network (or combination thereof) for transmitting data to and/or from the vehicle 108.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the vehicle 108 including sending and/or receiving data or signals to and from the vehicle 108, monitoring the state of the vehicle 108, and/or controlling the vehicle 108. Furthermore, the one or more memory devices of the one or more remote computing devices 106 can be used to store data including the sensor data, the training data, and/or the one or more machine-learned models that are stored in the operations computing system 104.

The one or more remote computing devices 106 can communicate (e.g., send and/or receive data and/or signals) with one or more devices including the operations computing system 104 and the vehicle 108 via the communications network 102. For example, the one or more remote computing devices 106 can request the location of the vehicle 108 or the state of one or more objects detected by the one or more sensors 114 of the vehicle 108, via the communications network 102.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 108 including a location (e.g., a latitude, longitude, and/or altitude), a velocity, acceleration, a trajectory, and/or a path of the vehicle 108 based in part on signals or data exchanged with the vehicle 108. In some implementations, the operations computing system 104 can include the one or more remote computing devices 106.

The vehicle 108 can be a ground-based vehicle (e.g., an automobile, a motorcycle, a train, a tram, a tracked vehicle, a light electric vehicle, a moped, a scooter, and/or an electric bicycle), an aircraft (e.g., aircraft including a fixed-wing airplane, a helicopter, a vertical take-off and landing aircraft, and/or a tiltrotor aircraft), a boat, a submersible vehicle (e.g., a submarine), an amphibious vehicle, a hovercraft, a robotic device (e.g. a bipedal, wheeled, or quadrupedal robotic device), and/or any other type of vehicle. Further, the vehicle 108 can include a vehicle that can be towed, pushed, and/or carried by another vehicle.

The vehicle 108 can be an autonomous vehicle that can perform various actions including driving, navigating, and/or operating, with minimal and/or no interaction from a human driver. The vehicle 108 can be configured to operate in one or more modes including, for example, a fully autonomous operational mode, a semi-autonomous operational mode, a manually operated mode (e.g., driven by a human driver), a park mode, and/or a sleep mode. A fully autonomous (e.g., self-driving) operational mode can be one in which the vehicle 108 can provide driving and navigational operation with minimal and/or no interaction from a human driver present in the vehicle. A semi-autonomous operational mode can be one in which the vehicle 108 can operate with some interaction from a human driver present in the vehicle. Park and/or sleep modes can be used between operational modes while the vehicle 108 performs various actions including waiting to provide a subsequent vehicle service, and/or recharging between operational modes.

An indication, record, and/or other data indicative of the state of the vehicle 108, the state of one or more passengers of the vehicle 108, and/or the state of an environment external to the vehicle 108 including one or more objects (e.g., the physical dimensions, velocity, acceleration, heading, location, sound, and/or appearance of the one or more objects) can be stored locally in one or more memory devices of the vehicle 108. Furthermore, the vehicle 108 can provide data indicative of the state of the one or more objects (e.g., physical dimensions, velocity, acceleration, heading, location, sound, and/or appearance of the one or more objects) within a predefined distance of the vehicle 108 to the operations computing system 104, which can store an indication, record, and/or other data indicative of the state of the one or more objects within a predefined distance of the vehicle 108 in one or more memory devices associated with the operations computing system 104 (e.g., remote from the vehicle).

The vehicle 108 can include and/or be associated with the vehicle computing system 112. The vehicle computing system 112 can include one or more computing devices located onboard the vehicle 108. For example, the one or more computing devices of the vehicle computing system 112 can be located on and/or within the vehicle 108. The one or more computing devices of the vehicle computing system 112 can include various components for performing various operations and functions including any of the one or more operations and/or functions performed by the operations computing system 104 and/or the one or more remote computing devices 106. Further, the one or more computing devices of the vehicle computing system 112 can include one or more processors and one or more tangible non-transitory, computer readable media (e.g., memory devices). The one or more tangible non-transitory, computer readable media can store instructions that when executed by the one or more processors cause the vehicle 108 (e.g., its computing system, one or more processors, and other devices in the vehicle 108) to perform operations and/or functions, including generating temporal instance representations and/or trajectory level representations based on the appearance and motion of objects over a plurality of time intervals; using the temporal instance representations as well as current detections of the objects to determine the past paths and candidate paths for the objects; predicting paths of the objects based on the use of machine-learned models trained to receive the past paths and candidate paths as an input and generate the predicted paths as an output; and/or generating path data including the predicted paths for each of the objects. In some embodiments, the vehicle computing system 112 can use the trajectory level representations to determine one or more predicted trajectories of the objects. Furthermore, the one or more memory devices of the vehicle computing system 112 can be used to store data including the path data, the trajectory data, the sensor data, the training data, and/or the one or more machine-learned models that are stored in the operations computing system 104.

Furthermore, the vehicle computing system 112 can perform one or more operations associated with the control, exchange of data, and/or operation of various devices and systems including vehicles, robotic devices, augmented reality devices, and/or other computing devices.

As depicted in FIG. 1, the vehicle computing system 112 can include the one or more sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more sensors 114 can be configured to generate and/or store data including the sensor data 116 associated with one or more objects that are proximate to the vehicle 108 (e.g., within range or a field of view of one or more of the one or more sensors 114). The one or more sensors 114 can include one or more microphones (e.g., a microphone array including a plurality of microphones), one or more Light Detection and Ranging (LiDAR) systems, one or more Radio Detection and Ranging (RADAR) systems, one or more cameras (e.g., visible spectrum cameras and/or infrared cameras), one or more sonar systems, one or more motion sensors, and/or other types of image capture devices and/or sensors. The sensor data 116 can include image data, radar data, LiDAR data, sound data, sonar data, and/or other data acquired by the one or more sensors 114. The one or more objects detected by the one or more sensors 114 can include, for example, pedestrians, cyclists, vehicles, bicycles, buildings, roads, sidewalks, trees, foliage, utility structures, bodies of water, and/or other objects. The one or more objects can be located on or around (e.g., in the area surrounding the vehicle 108) various parts of the vehicle 108 including a front side, rear side, left side, right side, top, or bottom of the vehicle 108. The sensor data 116 can be indicative of locations associated with the one or more objects within the surrounding environment of the vehicle 108 at one or more times. For example, the sensor data 116 can be indicative of one or more motion features and/or appearance features associated with one or more objects in an environment detected by the one or more sensors 114 including a LiDAR device and/or camera. By way of further example, the sensor data 116 can be indicative of a LiDAR point cloud and/or images (e.g., raster images) associated with the one or more objects within the surrounding environment. The one or more sensors 114 can provide the sensor data 116 to the autonomy computing system 120.

In addition to the sensor data 116, the autonomy computing system 120 can retrieve or otherwise obtain data including the map data 122. The map data 122 can provide detailed information about the surrounding environment of the vehicle 108. For example, the map data 122 can provide information regarding: the identity and/or location of different roadways, road segments, buildings, or other items or objects (e.g., lampposts, crosswalks and/or curbs); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 108. The positioning system 118 can be any device or circuitry for analyzing the position of the vehicle 108. For example, the positioning system 118 can determine a position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 108 can be used by various systems of the vehicle computing system 112 and/or provided to one or more remote computing devices (e.g., the operations computing system 104 and/or the remote computing device 106). For example, the map data 122 can provide the vehicle 108 relative positions of the surrounding environment of the vehicle 108. The vehicle 108 can identify its position within the surrounding environment (e.g., across six axes) based at least in part on the data described herein. For example, the vehicle 108 can process the sensor data 116 (e.g., LiDAR data, camera data) to match it to a map of the surrounding environment to get a determination of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 108 and determine a motion plan for controlling the motion of the vehicle 108 accordingly. In some implementations, the perception and prediction system 124, 126 (and/or the one or more corresponding functions) can be included in the same system. For example, the autonomy computing system 120 can receive the sensor data 116 from the one or more sensors 114, attempt to determine the state of the surrounding environment by performing various processing techniques on the sensor data 116 (and/or other data), and generate an appropriate motion plan through the surrounding environment, including for example, a motion plan navigates the vehicle 108 around the current and/or predicted locations of one or more objects detected by the one or more sensors 114. The autonomy computing system 120 can control the one or more vehicle control systems 138 to operate the vehicle 108 according to the motion plan.

The autonomy computing system 120 can identify one or more objects that are proximate to the vehicle 108 based at least in part on the sensor data 116 and/or the map data 122. For example, the perception system 124 can obtain state data 130 descriptive of a current and/or past state of an object that is proximate to the vehicle 108. The state data 130 for each object can describe, for example, an estimate of the object's current and/or past: location and/or position; speed; velocity; acceleration; heading; orientation; size/footprint (e.g., as represented by a bounding shape); class (e.g., pedestrian class, vehicle class, or bicycle class), and/or other state information. The perception system 124 can provide the state data 130 to the prediction system 126 (e.g., for predicting the movement of an object).

The prediction system 126 can generate prediction data 132 associated with each of the respective one or more objects proximate to the vehicle 108. The prediction data 132 can be indicative of one or more predicted future locations of each respective object. The prediction data 132 can be indicative of a predicted path (e.g., predicted trajectory) of at least one object within the surrounding environment of the vehicle 108. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128. In some embodiments, the prediction system 126 can determine the one or more predicted locations of each object based at least in part on use of the path data and/or plurality of temporal instance representations described herein.

The motion planning system 128 can determine a motion plan and generate motion plan data 134 for the vehicle 108 based at least in part on the prediction data 132 (and/or other data). The motion plan data 134 can include vehicle actions with respect to the objects proximate to the vehicle 108 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 108 can perform a certain action (e.g., pass an object) without increasing the potential risk to the vehicle 108 and/or violating any traffic laws (e.g., speed limits, lane boundaries, signage). The motion plan data 134 can include a planned trajectory, velocity, acceleration, and/or other actions of the vehicle 108. In some embodiments, the motion planning system 128 can determine the motion plan and/or generate the motion plan data based at least in part on use of the path data and/or plurality of temporal instance representations described herein.

The motion planning system 128 can provide the motion plan data 134 with data indicative of the vehicle actions, a planned trajectory, and/or other operating parameters to the vehicle control systems 138 to implement the motion plan data 134 for the vehicle 108. For instance, the vehicle 108 can include a mobility controller configured to translate the motion plan data 134 into instructions. By way of example, the mobility controller can translate a determined motion plan data 134 into instructions for controlling the vehicle 108 including adjusting the steering of the vehicle 108 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections). In some implementations, the communications system 136 can allow communication among one or more of the system on-board the vehicle 108. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop and/or smartphone) can be viewable by a user of the vehicle 108 that is located in the front of the vehicle 108 (e.g., driver's seat, front passenger seat). Additionally, or alternatively, a display device can be viewable by a user of the vehicle 108 that is located in the rear of the vehicle 108 (e.g., a back passenger seat). For example, the autonomy computing system 120 can provide one or more outputs including a graphical display of the location of the vehicle 108 relative to one or more objects detected by the one or more sensors 114 including one or more radar devices. By way of further example, the autonomy computing system 120 can provide one or more outputs including a graphical display of the location of the vehicle 108 on a map of a geographical area within one kilometer of the vehicle 108, including the locations of objects around the vehicle 108. A passenger of the vehicle 108 can interact with the one or more human-machine interfaces 140 by touching a touchscreen display device associated with the one or more human-machine interfaces to indicate, for example, a stopping location for the vehicle 108.

In some embodiments, the vehicle computing system 112 can perform one or more operations including activating, based at least in part on one or more signals or data (e.g., the sensor data 116, the map data 122, the state data 130, the prediction data 132, and/or the motion plan data 134) one or more vehicle systems associated with operation of the vehicle 108. For example, the vehicle computing system 112 can send one or more control signals to activate one or more vehicle systems that can be used to control and/or direct the travel path of the vehicle 108 through an environment.

By way of further example, the vehicle computing system 112 can activate one or more vehicle systems including: the communications system 136 that can send and/or receive signals and/or data with other vehicle systems, other vehicles, or remote computing devices (e.g., remote server devices); one or more lighting systems (e.g., one or more headlights, hazard lights, and/or vehicle compartment lights); one or more vehicle safety systems (e.g., one or more seatbelt and/or airbag systems); one or more notification systems that can generate one or more notifications for passengers of the vehicle 108 (e.g., auditory and/or visual messages about the state or predicted state of objects external to the vehicle 108); braking systems; propulsion systems that can be used to change the acceleration and/or velocity of the vehicle which can include one or more vehicle motor or engine systems (e.g., an engine and/or motor used by the vehicle 108 for locomotion); and/or steering systems that can change the path, course, and/or direction of travel of the vehicle 108.

Figure 2:
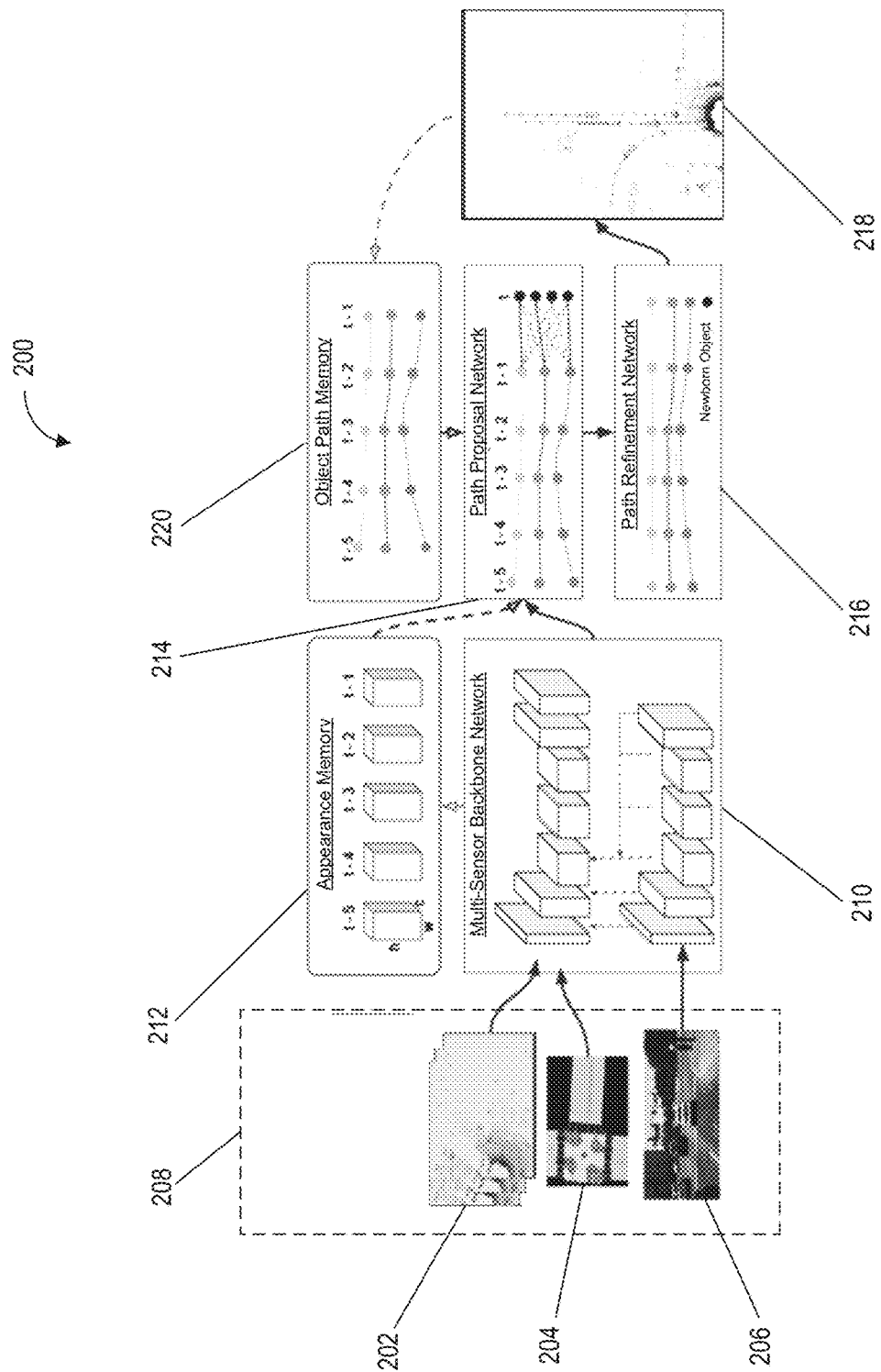
FIG. 2 depicts an example architecture of a multi-sensor path prediction network according to example embodiments of the present disclosure.

FIG. 2 depicts an example architecture of a multi-sensor path prediction network according to example embodiments of the present disclosure. One or more operations and/or functions in FIG. 2 can be implemented and/or performed by one or more devices (e.g., one or more computing devices) and/or systems including, for example, the operations computing system 104, the vehicle 108, or the vehicle computing system 112, which are depicted in FIG. 1. Further, the one or more devices and/or systems in FIG. 2 can include one or more features, attributes, and/or capabilities of one or more devices and/or systems including, for example, the operations computing system 104, the vehicle 108, or the vehicle computing system 112, which are depicted in FIG. 1.

As illustrated, FIG. 2 shows an example of an architecture 200 including LiDAR data 202, map data 204, image data 206, multi-sensor data 208, multi-sensor model 210, appearance memory 212, one or more path proposal models 214, one or more path refinement models 216, predicted path data 218, and object path memory 220.

The LiDAR data 202 can include LiDAR point cloud data generated by one or more LiDAR devices that detect an environment around the one or more LiDAR devices. The LiDAR data 202 can include a three-dimensional representation of the environment. The three-dimensional representation of the environment can include a set of three-dimensional points (e.g., x, y, and z coordinates) that indicate the location of surfaces in the environment. For example, the LiDAR data 202 can include a three-dimensional representation of an environment including the locations of one or more objects in that environment (e.g., one or more objects including pedestrians, vehicles, roads, and/or buildings). Further, the LiDAR data 202 can be based at least in part on one or more LiDAR sweeps by one or more LiDAR devices mounted on a vehicle (e.g., an autonomous vehicle) that traverses the environment.

The map data 204 can include information associated with the state of an environment (e.g., a geographic area) including the locations (e.g., latitude, longitude, and/or altitude) and/or dimensions (e.g., length, width, and/or height) of one or more objects and/or features of the environment. In some embodiments, the map data 204 can include a bird's eye representation of a geographic area. For example, the map data 204 can include a top-down representation of an environment that includes information associate with the relative location of features including roads, sidewalks, and/or buildings. Further, the map data 204 can be defined relative to an ego vehicle as the ego vehicle traverses the environment depicted by the map data 204. Based at least in part on ego motion information associated with the ego vehicle, the locations of one or more objects (e.g., locations of the one or more objects relative to the ego vehicle and/or a latitude and/or longitude associated with of the one or more objects) in the environment can be determined.

The image data 206 can include information associated with one or more images of an environment. The one or more images associated with the image data 204 can include various image formats including raster (e.g., bitmap), vector, and/or voxel image formats. Further, the one or more images be two-dimensional images of an environment captured from an angle determined by the position of the respective image capture device (e.g., a camera). For example, the image data 206 can include one or more RGB images of an environment captured by a camera. Further, the image data 206 can be based at least in part on images captured by one or more cameras mounted on a vehicle (e.g., an autonomous vehicle) that traverses the environment.

The multi-sensor data 208 can include any combination of the LiDAR data 202, the map data 204, and/or the image data 206. Further, the multi-sensor data 208 can be provided to the one or more multi-sensor models 210 in one or more portions that can include various combinations of the LiDAR data 202, the map data 204, and/or the image data 206. For example, the LiDAR data 202, the map data 204, and the image data 206 can be provided to different multi-sensor models of the one or more multi-sensor models 210 respectively. By way of further example, the LiDAR data 202 and the map data 204 can be provided to one of the one or more multi-sensor models 210, and the image data 206 can be provided to a different one of the one or more multi-sensor models 210.

The one or more multi-sensor models 210 can include one or more machine-learned models (e.g., one or more recurrent neural networks) that are configured to: receive one or more inputs including one or more portions of the multi-sensor data 208; perform one or more operations associated with the one or more inputs including extracting one or more motion features and/or one or more motion features from the one or more objects represented by the multi-sensor data 208; and generate one or more outputs including a set of feature maps that can be stored in the appearance memory 212 and/or provided as an input to the path proposal model 214.

In this example, the multi-sensor data 208 is provided as input to the one or more multi-sensor models 210, which store output (a plurality of feature maps representing an environment associated with the multi-sensor data 208 over a plurality of time intervals) in the appearance memory 212. The plurality of feature maps generated by the multi-sensor model 210 can include appearance features and/or motion features of the one or more objects in the environment (e.g., vehicles, pedestrians, buildings, and/or roads) associated with the multi-sensor data 208. Further, the one or more multi-sensor models 210 can generate a plurality of temporal instance representations associated with the appearance and/or motion of the one or more objects represented in the plurality of feature maps.

The appearance memory 212 can store information and/or data associated with the appearance of one or more objects that were previously detected and/or previously represented by the multi-sensor data 208. For example, the appearance memory can include a plurality of feature maps associated with a detected environment, in which each feature map includes information associated with the appearance of one or more objects at a time interval of a plurality of time intervals (e.g., sequential time intervals).

The object path memory 220 can store information and/or data associated with one or more paths (e.g., a set of locations at which an object was present at and corresponding time intervals in the past) corresponding to each of the one or more objects that were previously detected and/or previously represented by the multi-sensor data 208. For example, the object path memory can include a plurality of feature maps associated with a detected environment, in which each feature map includes information associated with the geographic location (e.g., latitude, longitude, and/or altitude) of each of the one or more objects at a time interval of a plurality of time intervals (e.g., sequential time intervals).

The plurality of temporal instance representations generated as output by the one or more multi-sensor models 210 can be provided as an input to the one or more path proposal models 214 (e.g., one or more recurrent neural networks). The one or more path proposal models 212 can be configured and/or trained to generate (based on the plurality of temporal instance representations) output including one or more path proposals for the one or more objects associated with the plurality of temporal instance representations. The one or more path proposals can be based at least in part on optimizing matches between previous paths of the one or more objects and current detections of the one or more objects. The one or more path proposals can include one or more candidate paths for the one or more objects. When multiple candidate paths are associated with a single object, the multiple candidate paths can be merged and can include overlapping candidate paths, which can later be refined into a single path by the one or more path refinement models 216. In some embodiments, each of the one or more objects can be associated with more than one candidate paths, which can be refined by the one or more path refinement models 216 that can be configured and/or trained to generate one or more refined predicted paths that replace duplicate candidate paths.

The one or more path refinement models 216 (e.g., one or more recurrent neural networks) can be configured and/or trained to receive output including information and/or data associated with the one or more path proposals generated by the one or more path proposal models 214. Further, the one or more path refinement models 216 can be configured to perform one or more operations including generating one or more confidence scores associated with the one or more path proposals. The one or more confidence scores can be associated with accuracy of each of the one or more path proposals (e.g., a path proposal that is more accurate and/or more likely to be correct can have a greater score than a path proposal that is less accurate and/or less likely to be correct). In some embodiments, the one or more path refinement models 216 can generate one or more refined predicted paths corresponding to the one or more objects. The one or more refined predicted paths generated by the one or more path refinement models 216 can be based at least in part on refinement of a bounding box associated with each of the one or more objects at each time interval associated with each respective object. The one or more refined predicted paths can then be ranked based at least in part on their respective confidence scores, with the highest ranking predicted paths being included in the predicted path data 218.

The predicted path data 218 can include information associated with the one or more predicted paths of the one or more objects. For example, the predicted path data 218 can include one or more predicted locations (e.g., geographic locations including latitude, longitude, and/or altitude) of the one or more objects at one or more time intervals subsequent to the current time interval. Further, the predicted path data 218 can include information associated with one or more predicted trajectories of the one or more objects. In some embodiments, one or more portions of the predicted path data 218 can be stored in the object path memory 220.

Figure 3:
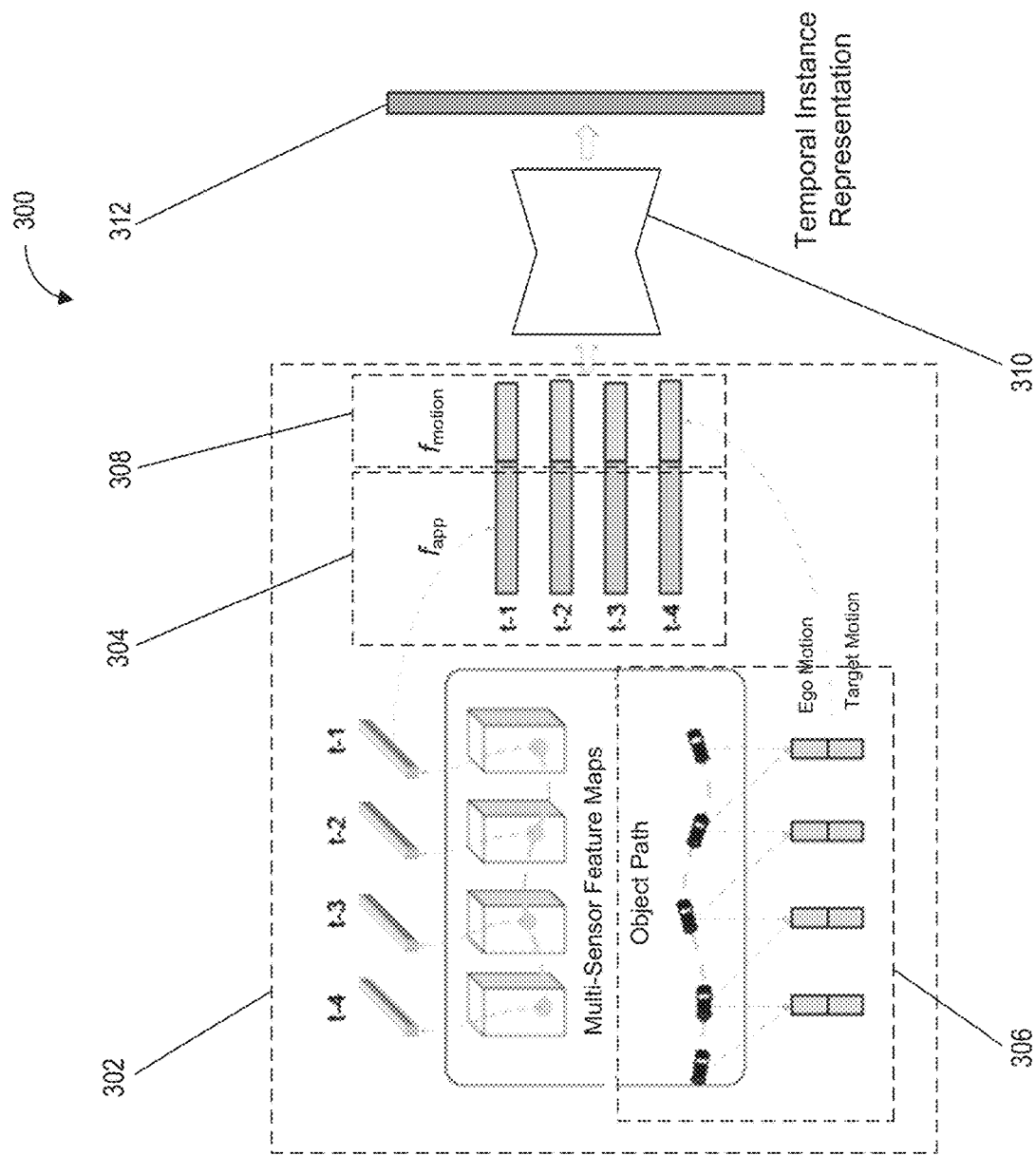
FIG. 3 depicts an example of generating a temporal instance representation according to example embodiments of the present disclosure.

FIG. 3 depicts an example diagram illustrating a technique for the generation of a temporal instance representation according to example embodiments of the present disclosure. One or more operations and/or functions in FIG. 3 can be implemented and/or performed by one or more devices (e.g., one or more computing devices) and/or systems including, for example, the operations computing system 104, the vehicle 108, or the vehicle computing system 112, which are depicted in FIG. 1. Further, the one or more devices and/or systems in FIG. 3 can include one or more features of one or more devices and/or systems including, for example, the operations computing system 104, the vehicle 108, or the vehicle computing system 112, which are depicted in FIG. 1.

As illustrated, FIG. 3 shows an example technique 300 for the generation of temporal instance representations including multi-sensor feature maps 302, appearance features data 304, object path data 306, motion features data 308, machine-learned model 310, and a temporal instance representation 312.

The multi-sensor feature maps 302 can include feature maps associated with features of one or more detected objects in an environment over a plurality of time intervals. Further, the multi-sensor feature maps 302 can include the appearance features data 304, the object path data 306, and/or the motion features data 308. The appearance features data 304 can include information associated with the appearance of the one or more objects over the plurality of time intervals. The object path data 306 can include information associated with one or more locations of an ego device (e.g., the vehicle 108 configured with the one or more sensors 114) that detects one or more objects over a plurality of time intervals. Further, the motion features data 308 can include information associated with the one or more locations of the one or more objects based at least in part on the position of each of the one or more objects relative to the location of the ego vehicle at each of the plurality of time intervals. The motion features data 308 can include information associated with the motion of the one or more objects over the plurality of time intervals.

The multi-sensor feature maps 302 can be provided as part of an input to the machine-learned model 310 (e.g., a convolutional neural network). The machine-learned model 310 can be configured and/or trained to: receive input including the multi-sensor feature maps 302; perform one or more operations on the input; and generate an output including the temporal instance representation 312. The temporal instance representation 312 can include information associated with the appearance and motion of the detected objects over the plurality of time intervals.

Figure 4:
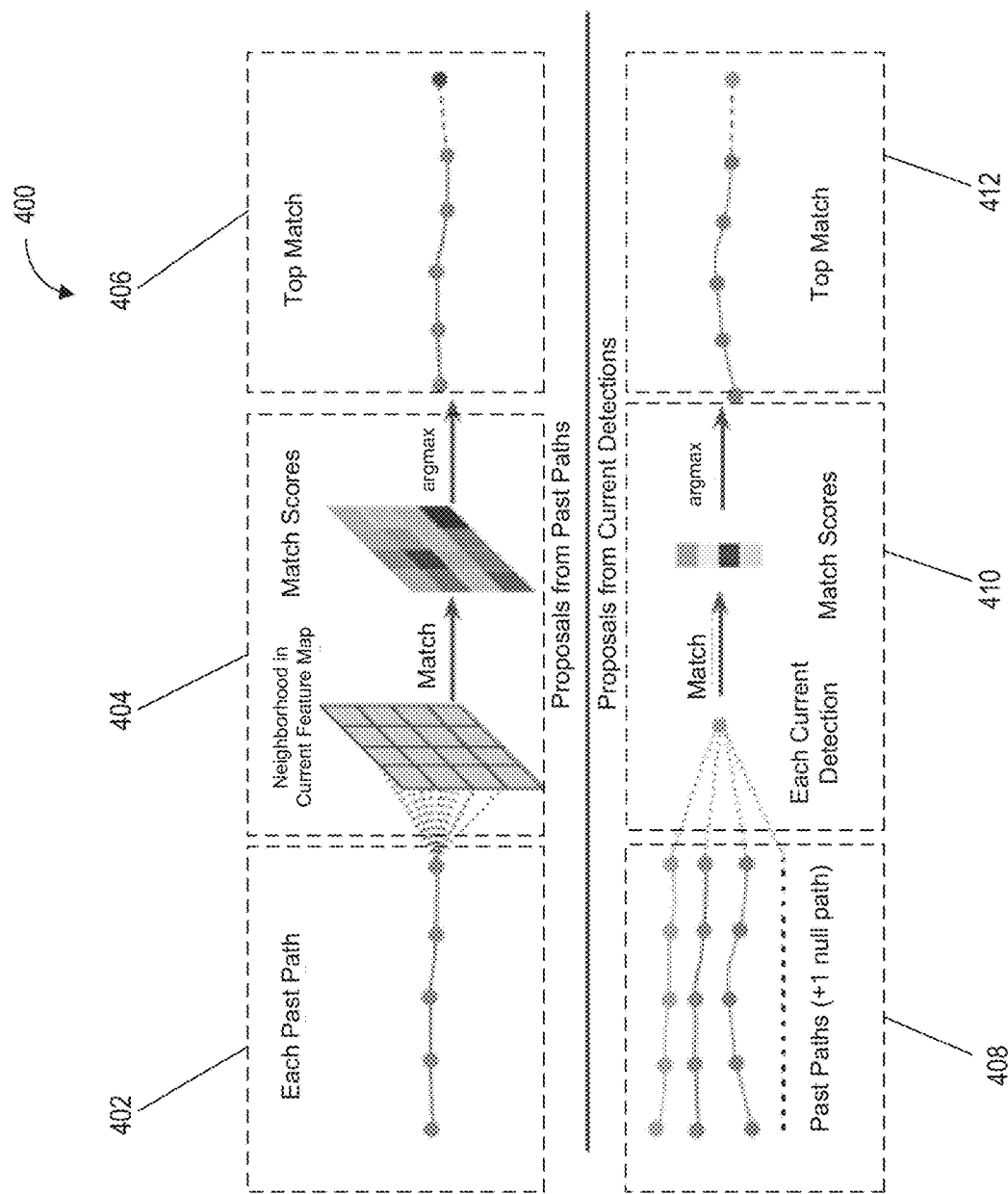
FIG. 4 depicts an example of determining a proposed path according to example embodiments of the present disclosure.

FIG. 4 depicts an example of determining a proposed path according to example embodiments of the present disclosure. One or more operations and/or functions in FIG. 4 can be implemented and/or performed by one or more devices (e.g., one or more computing devices) and/or systems including, for example, the operations computing system 104, the vehicle 108, or the vehicle computing system 112, which are depicted in FIG. 1.

As illustrated, FIG. 4 shows a path proposal technique 400 that includes one or more past paths 402, matching operations 404, matched path data 406, one or more past paths 408, matching operations 410, and matched path data 412.

The past path 402 can include information (e.g., a position of an object relative to an ego vehicle; and/or a longitude, latitude, and/or altitude of the object) associated with the location of a respective detected object over a plurality of past time intervals. In some embodiments, the past path 402 can be based at least in part on information stored in an object path memory.

The matching operations 404 can include the use of a matching function to determine whether the past path proposals associated with a past path (e.g., the past path 402) agree with the state of the currently detected object. To make the past path proposals agree with the currently detected objects, each past object path can be matched with voxels on a current feature map (e.g., appearance feature map) associated with the past object path. Further, the past path proposal function $$k = \underset{i \in \Omega}{\mathrm{argmax}} MatchScore(O^{t-1}, d_i)$$

can be evaluated to determine an optimal or highest ranking match of each currently detected object with each past object path $O^{t-1}$. The matched path data 406 can include the optimal or highest ranked path proposal.

Each of the one or more past paths 408 can include information (e.g., a location and/or position of an object relative to an ego vehicle and/or a longitude and latitude of the object) associated with the location of a respective detected object over a plurality of past time intervals. Further, the one or more past paths 408 can include information associated with the location of one or more currently detected objects including one or more objects that were newly detected (e.g., not detected in the plurality of past time intervals). Furthermore, the one or more past paths 408 can include a null path in addition to the paths of the same set of objects as the previously detected objects in the one or more past paths 402. The null path in the one or more past paths 408 can be included so that matching with past paths and new paths associated with newly detected objects can be unified in the same framework.

The matching operations 410 can include the use of a matching function to determine whether the past path proposals and a null path agree with the states of currently detected objects. To make the past path proposals agree with the currently detected objects, each past object path can be matched with voxels on a current feature map associated with the past object path. Further, the past path proposal function $$k = \underset{i=0,\ldots,M}{\mathrm{argmax}} MatchScore(O_i^{t-1}, d)$$

can be evaluated to determine an optimal or highest ranking match of each currently detected object with each of the past object paths $O_i^{t-1}$. The matched path data 412 can include the optimal or highest ranked path proposals.

Figure 5:
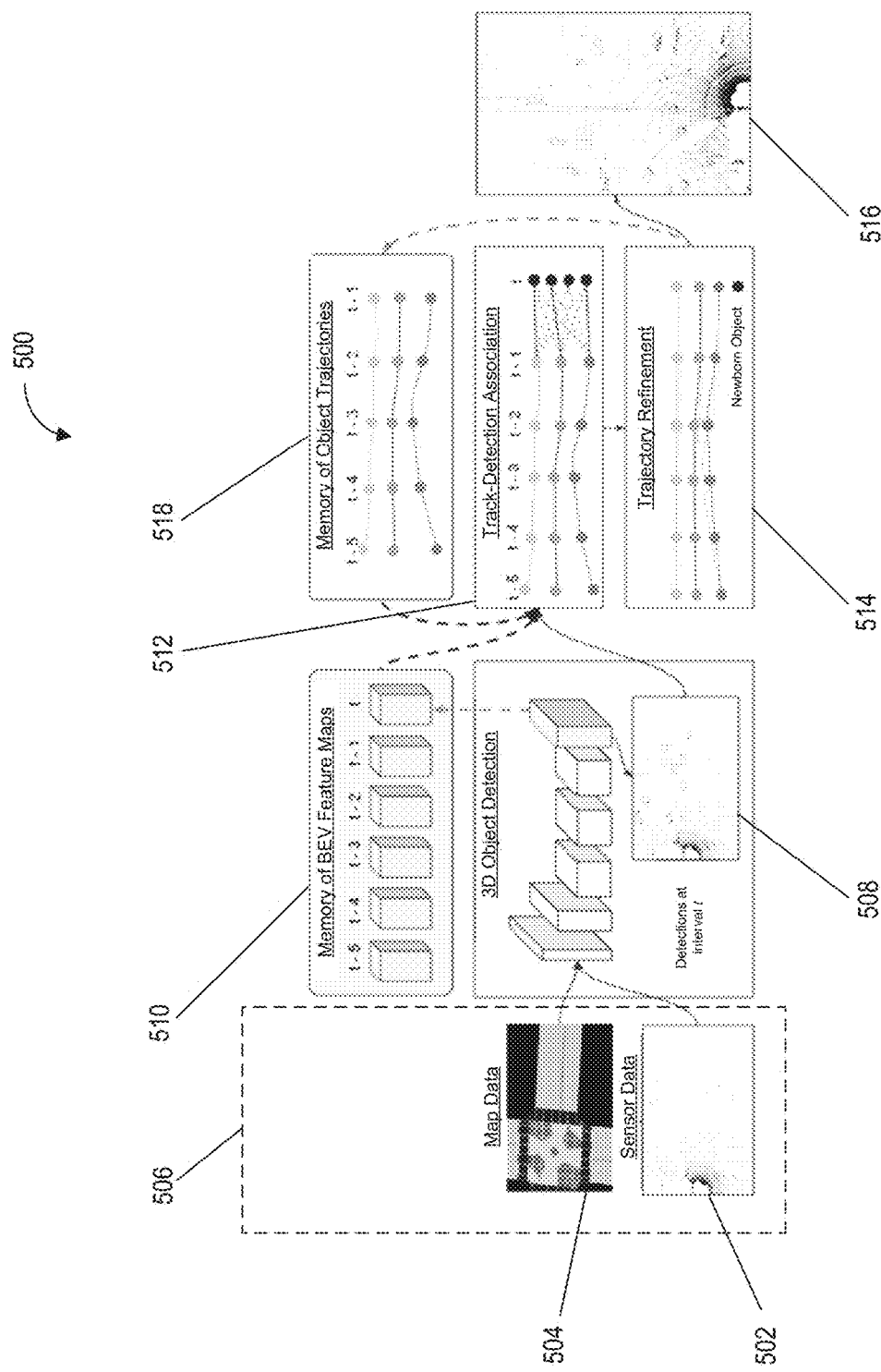
FIG. 5 depicts an example architecture of a multi-sensor trajectory prediction network according to example embodiments of the present disclosure.

FIG. 5 depicts an example architecture of a multi-sensor trajectory prediction network according to example embodiments of the present disclosure. One or more operations and/or functions in FIG. 5 can be implemented and/or performed by one or more devices (e.g., one or more computing devices) and/or systems including, for example, the operations computing system 104, the vehicle 108, or the vehicle computing system 112, which are depicted in FIG. 1. Further, the one or more devices and/or systems in FIG. 5 can include one or more features, attributes, and/or capabilities of one or more devices and/or systems including, for example, the operations computing system 104, the vehicle 108, or the vehicle computing system 112, which are depicted in FIG. 1.

As illustrated, FIG. 5 shows an example of an architecture 500 including LiDAR data 502, map data 504, multi-sensor data 506, one or more multi-sensor models 508, appearance memory 510, one or more track detection and association models 512, one or more trajectory refinement models 514, predicted trajectory data 516, and object trajectory memory 518.

The LiDAR data 502 can include LiDAR point cloud data generated by one or more LiDAR devices that detect an environment around the one or more LiDAR devices. The LiDAR data 502 can include a three-dimensional representation of the environment. The three-dimensional representation of the environment can include a set of three-dimensional points (e.g., x, y, and z coordinates) that indicate the location of surfaces in the environment. For example, the LiDAR data 502 can include a three-dimensional representation of an environment including the locations of one or more objects in that environment (e.g., one or more objects including pedestrians, vehicles, roads, and/or buildings). Further, the LiDAR data 502 can be based at least in part on one or more LiDAR sweeps by one or more LiDAR devices mounted on a vehicle (e.g., an autonomous vehicle) that traverses the environment. The LiDAR data 502 can include a voxel based representation of the LiDAR data in a Bird's Eye View. Further, the LiDAR data 502 can be based at least in part on multiple LiDAR sweeps that are concatenated along a height dimension with the ego-motion compensated for previous sweeps.

The map data 504 can include information associated with the state of an environment (e.g., a geographic area) including the locations (e.g., latitude, longitude, and/or altitude) and/or dimensions (e.g., length, width, and/or height) of one or more objects and/or features of the environment. In some embodiments, the map data 504 can include a bird's eye representation of a geographic area. For example, the map data 504 can include a top-down representation of an environment that includes information associate with the relative location of features including roads, sidewalks, and/or buildings. Further, the map data 504 can be defined relative to an ego vehicle as the ego vehicle traverses the environment depicted by the map data 504. Based at least in part on ego motion information associated with the ego vehicle, the locations of one or more objects (e.g., locations of the one or more objects relative to the ego vehicle and/or a latitude and/or longitude associated with of the one or more objects) in the environment can be determined. In some embodiments, the map data 504 can be based at least in part on high definition map data.

The multi-sensor data 506 can include any combination of the LiDAR data 502 and the map data 504. Further, the multi-sensor data 506 can be provided to the one or more multi-sensor models 508 in one or more portions that can include various combinations of the LiDAR data 502 and/or the map data 504. The LiDAR data 502 and the map data 504 can be provided to different multi-sensor models of the one or more multi-sensor models 508 respectively. For example, a combination of the LiDAR data 502 and the map data 504 can be provided to one of the one or more multi-sensor models 508. Further, the multi-sensor data 506 can be provided to a first machine-learned model of the one or more multi-sensor models 508 which can include one or more convolutional neural networks that are configured and/or trained to: receive one or more inputs including one or more portions of the multi-sensor data 506 in which $x^t$ represents the multi-sensor data 506 (e.g., LiDAR data and map data) from a bird's eye view; perform one or more operations on the one or more inputs including intermediate feature representation operations that can be expressed as $\mathcal{F}_{bev}^t(x^t) = CNN_{bev}(x^t)$ in which a feature map of $x^t$ from a bird's eye view is provided to the convolutional neural network; and generate one or more outputs including an intermediate feature representation that can be stored in the appearance memory 510 and/or provided as an input to the one or more track detection and association models 512. Further, a convolutional detection header can be used to output dene detections, parameterized as $(u_i^t, v_i^t, w_i, l_i, \theta_i^t)$, in which u and v represent the position of an object, w and l represent the size of an object, and $\theta$ represents the orientation of an object. The dense detections can be expressed as $\mathcal{D}^t = CNN_{det}(\mathcal{F}_{bev}^t)$, in which the number of detections $N_t = |\mathcal{D}^t|$ varies per timestamp c.

In this example, the multi-sensor data 506 is provided as input to the one or more multi-sensor models 508, which store output (a plurality of feature maps representing an environment associated with the multi-sensor data 506 over a plurality of time intervals) in the appearance memory 510. The plurality of feature maps generated by the one or more multi-sensor model 508 can include appearance features and/or motion features including the trajectory of each of the one or more objects in the environment (e.g., vehicles, pedestrians, buildings, and/or roads) associated with the multi-sensor data 506. Further, the one or more multi-sensor models 508 can generate a plurality of trajectory level representations associated with the appearance and/or motion of the one or more objects represented in the plurality of feature maps.

The appearance memory 510 can store information and/or data associated with the appearance of one or more objects that were previously detected and/or previously represented by the multi-sensor data 506. For example, the appearance memory can include a plurality of feature maps associated with a detected environment, in which each feature map includes information associated with the appearance of one or more objects at a time interval of a plurality of time intervals (e.g., sequential time intervals).

The object trajectory memory 518 can store information and/or data associated with one or more trajectories corresponding to each of the one or more objects that were previously detected and/or previously represented by the multi-sensor data 506. For example, the object trajectory memory 518 can include a plurality of feature maps associated with a detected environment, in which each feature map includes information associated with the geographic location (e.g., latitude, longitude, and/or altitude) of each of the one or more objects at a time interval of a plurality of time intervals (e.g., sequential time intervals).

The plurality of trajectory level representations generated as output by the one or more multi-sensor models 508 can be provided as an input to the one or more track detection and association models 512 (e.g., one or more convolutional neural networks). The one or more track detection and association models 512 can be configured and/or trained to generate (based on the plurality of trajectory level representations) output including one or more tracks associated with the one or more objects. The one or more tracks can be based at least in part on the optimization of matches between previous tracks of the one or more objects and current detections of the one or more objects. Further, the one or more tracks can include one or more candidate trajectories for the one or more objects. The one or more candidate trajectories represent potential trajectories of the one or more objects. In some embodiments, determination of the one or more tracks can be based at least in part on use of an affinity matrix that captures the similarity between the one or more tracks and current detections of the one or more objects. Further, matching the one or more tracks to the current detections can include solving a bipartite matching problem defined by C with the Hungarian algorithm. The affinity matrix $C \in \mathbb{R}^{N_t \times (M_{t-1} + N_t)}$, in which $N_t$ represent virtual candidates for $M_{t-1}$ tracks can be computed as follows:

$$C_{i,j} = \begin{cases} MLP_{pair}(f(\mathcal{D}_i^t), h(\mathcal{P}_j^{t-1})) & \text{if } j \leq M_{t-1} \\ MLP_{unary}(f(\mathcal{D}_i^t)) & \text{if } j = N_t + i, \\ -inf & \text{otherwise} \end{cases}$$

in which f (e.g., appearance features) and h (e.g., motion features) are single time interval features of the one or more objects; $MLP_{pair}$ predicts the affinity score of any detection (e.g., current detection) and track (e.g., the one or more tracks) pair; and $MLP_{unary}$ estimates the score of any detection being a new instance (e.g., a detection that was not previously detected).

For objects that are not matched with tracks, single-object tracking can be used. An optimal detection candidate k (an optimal match) can be determined by solving for the optimal match $$k = \underset{i \in \Omega_j}{\operatorname{argmax}} MLP_{pair}(f(\mathcal{D}_i^t), h(\mathcal{P}_j^{t-1})),$$

in which the detection candidates $\hat{\mathcal{I}}_i^t$ are defined as voxels within a local neighborhood $\Omega_j$ around the center position of a respective object at the current time interval's feature map $\mathcal{F}_{bev}^t$.

When multiple candidate trajectories are associated with a single object, the multiple candidate trajectories can be merged and can include overlapping candidate trajectories, which can later be refined into a single trajectory by the one or more trajectory refinement models 514. In some embodiments, each of the one or more objects can be associated with more than one candidate trajectories, which can be refined by the one or more trajectory refinement models 514. Further, the one or more trajectory refinement models 514 can be configured and/or trained to generate one or more refined predicted trajectories that replace duplicate candidate trajectories.

The one or more trajectory refinement models 514 (e.g., one or more long short-term memory neural networks) can be configured and/or trained to receive input including the one or more candidate trajectories generated by the one or more track detection and association models 512; perform one or more operations associated with refinement of the one or more candidate trajectories; and generate an output including one or more predicted trajectories of the one or more objects.

The one or more operations associated with refinement of the one or more candidate trajectories can include the use of classification to reduce or eliminate false positive detections. Further the one or more operations associated with refinement of the one or more candidate trajectories can include the use of residual regression to reduce localization error that is associated with either detection of the one or more objects or association of the one or more objects with one or more respective tracks. For each updated track, the respective LSTM representation can be updated based at least in part on the current association, and estimation of the confidence score ($score_i$) and center position offsets $\Delta u_i^{t-T_0+1:t}$, $\Delta v_i^{t-T_0+1:t}$ for the most recent $T_0$ time interval. As such, refinement of an object's trajectory can be expressed as follows: $score_i$, $\Delta u_i^{t-T_0+1:t}$, $\Delta v_i^{t-T_0+1:t}$=$MLP_{refine}(h(\mathcal{P}_j^{t-1}))$ Further, the one or more trajectory refinement models 514 can be configured to perform one or more operations including generating one or more confidence scores associated with the one or more candidate trajectories. The one or more confidence scores can be associated with accuracy of each of the one or more candidate trajectories (e.g., a trajectory proposal that is more accurate and/or more likely to be correct can have a greater score than a candidate trajectory that is less accurate and/or less likely to be correct).

In some embodiments, any of the one or more confidence scores associated with the one or more candidate trajectories and/or one or more trajectory predictions can be associated with one or more probability distributions. The probability distribution for any of the one or more confidence scores associated with any of the one or more candidate trajectories and/or one or more trajectory proposals can be associated with one or more probabilities of any of the one or more candidate trajectories and/or the one or more predicted trajectories being accurate (e.g., a more accurate predicted trajectory is a predicted trajectory that is closer in terms of distance and/or angle) to the actual trajectory that an object will follow in the future). For example, in a Gaussian distribution associated with the one or more confidence scores, the one or more predicted trajectories that are most probable will be clustered around the region that is within one standard deviation of the mean of the probability distribution, while the least probable of the one or more predicted trajectories can be associated with outliers two or more standard deviations from the mean.

The one or more confidence scores can be sent to and/or accessed by any system that uses the one or more candidate trajectories and/or one or more predicted trajectories. For example, a motion planning system of an autonomous vehicle can use the one or more confidence scores when generating a motion plan for a vehicle. A high confidence score associated with a predicted path can result in the motion planning system providing a different (e.g., higher vehicle velocity and less likely to slow down) motion plan than a low confidence score which may indicate that there is a greater likelihood than not that the predicted trajectory is erroneous.

In some embodiments, the one or more trajectory refinement models 514 can generate one or more refined predicted trajectories corresponding to the one or more objects. The one or more refined predicted trajectories generated by the one or more trajectory refinement models 514 can be based at least in part on refinement of a bounding box associated with each of the one or more objects at each time interval associated with each respective object. The one or more refined predicted trajectories can then be ranked based at least in part on their respective confidence scores, with the highest ranking predicted trajectories being included in the predicted trajectory data 516.

The predicted trajectory data 516 can include information associated with the one or more predicted trajectories of the one or more objects. For example, the predicted trajectory data 516 can include one or more predicted locations (e.g., geographic locations including latitude, longitude, and/or altitude) of the one or more objects at one or more time intervals subsequent to the current time interval. Further, the predicted trajectory data 516 can include information associated with one or more predicted trajectories of the one or more objects. In some embodiments, one or more portions of the predicted trajectory data 516 can be stored in the object trajectory memory 518.

Figure 6:
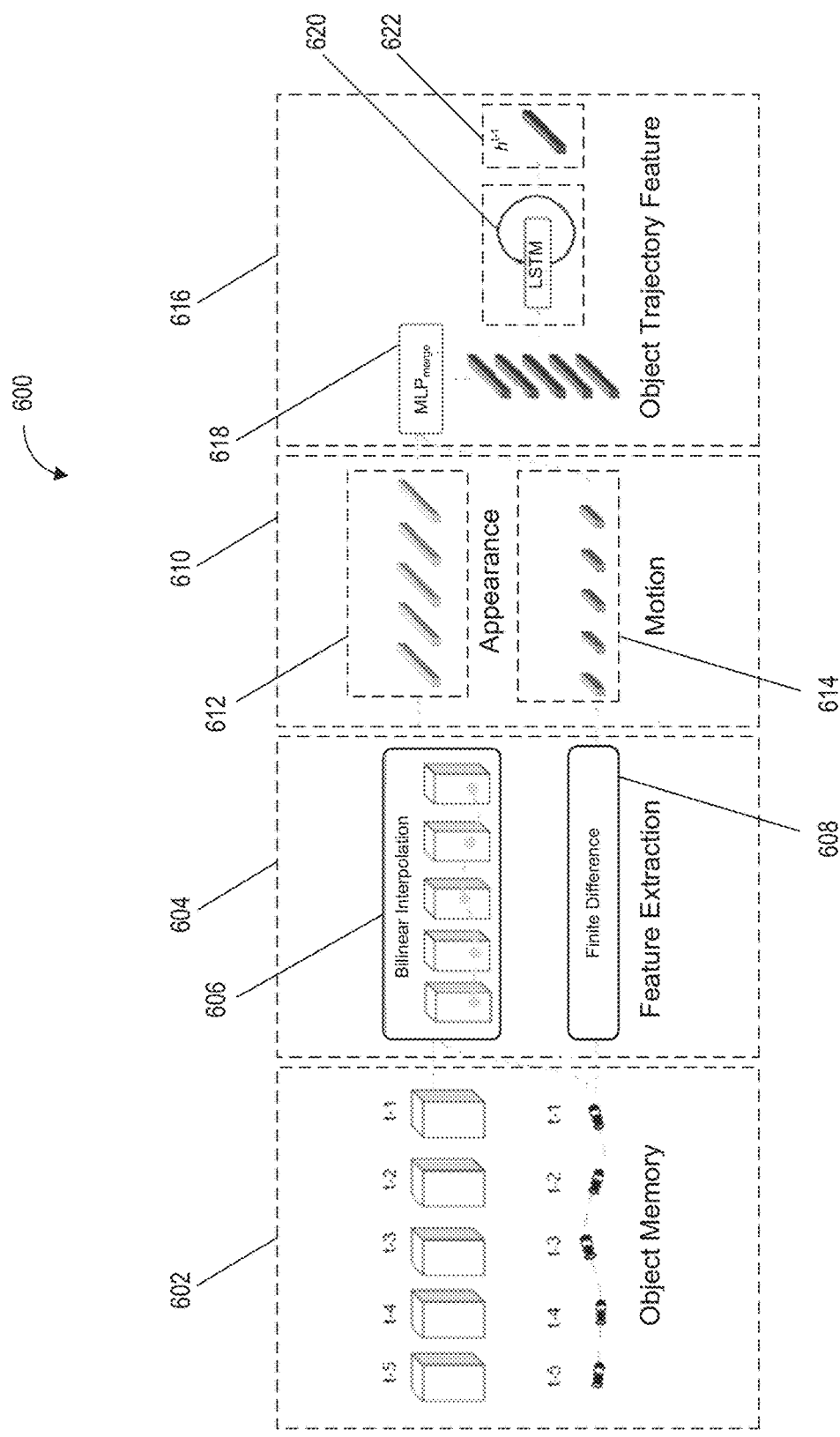
FIG. 6 depicts an example of generating trajectory level representations according to example embodiments of the present disclosure.

FIG. 6 depicts an example diagram illustrating a technique for the generation of a trajectory level representations according to example embodiments of the present disclosure. One or more operations and/or functions in FIG. 6 can be implemented and/or performed by one or more devices (e.g., one or more computing devices) and/or systems including, for example, the operations computing system 104, the vehicle 108, or the vehicle computing system 112, which are depicted in FIG. 1. Further, the one or more devices and/or systems in FIG. 6 can include one or more features of one or more devices and/or systems including, for example, the operations computing system 104, the vehicle 108, or the vehicle computing system 112, which are depicted in FIG. 1.

As illustrated, FIG. 6 shows an example technique 600 for the generation of trajectory level representations including object memory operations 602, feature extraction operations 604, appearance feature extraction operations 606, motion feature extraction operations 608, combined object features 610, appearance features 612, motion features 614, trajectory determination operations 616, machine-learned model 618, machine-learned model 620, and a trajectory level instance representation 622.

The object memory data 602 can include feature maps associated with features of one or more detected objects in an environment over a plurality of time intervals. For example, the object memory data 602 can include information and/or data associated with the appearance and/or motion of the one or more objects that were detected including the position, size, and/or orientation of each of the one or more detected objects. Further, the features included in the object memory data 602 can be extracted using the feature extraction operations 604. For example, given a tracked object $\mathcal{P}_i^t = \mathcal{D}_i^{t_0 \cdots t}$ that has been tracked from time interval $t_0$ to time interval $t_1$, determining $f_i^{bev,t}$ can be included as part of the appearance feature extraction operations 606 that can extract appearance features of each object; and determining $f_i^{velocity,t}$ can be included as part of the motion feature extraction operations 608 that can extract motion features of each object. Further, the appearance feature extraction operations 606 can be expressed as: $f_i^{bev,t}$=Bilinearinterp ($\mathcal{F}_{bev}^t,(u_i^t,v_i^t)$), in which $\mathcal{F}_{bev}^t$ is the feature map of the bird's eye view of the object for the object's position over time represented by $u_i^t$, $v_i^t$. The result of the appearance feature extraction operations 606 can be the appearance features 612.

Further, the motion feature extraction operations 608 can be expressed as: $f_i^{velocity,t}$, in which $\dot{x}_i$ and $\dot{x}_{ego}$ are the two-dimensional velocities of the i-th object and the ego-vehicle (e.g., the vehicle on which the sensors that detected the one or more objects are mounted) respectively; and $\dot{\theta}_{ego}$ is the angular velocity of the ego-vehicle. Newly detected objects can be assigned an initial velocity of zero (0). The result of the motion feature extraction operations 608 can be the motion features 614.

The appearance features 612 and the motion features 614 can be combined to create the combined object features 610. The combined object features 610 can be provided as part of an input to the machine-learned model 618 (e.g., a multi-layer perceptron) that is used as part of the trajectory determination operations 616. The machine-learned model 618 can be configured and/or trained to: receive input including the combined object features 610; perform one or more operations on the input; and generate an output including merged object features that can be expressed as $f(\mathcal{D}_i^t)=\text{MLP}_{merge}(f_i^{bev,t}, f_i^{velocity,t})$ and provided as an input to the machine-learned model 620 (e.g., a long short-term memory model) that is used as part of the trajectory determination operations 616. The machine-learned model 620 can be configured and/or trained to: receive input including the merged object features generated by the machine-learned model 618; perform one or more operations on the input; and generate an output including the trajectory level representation 622. The trajectory level representation 622 which can be expressed as $h(\mathcal{P}_i^t)=\text{LSTM}(f(\mathcal{D}_i^t))$ can include information associated with the predicted trajectory of the detected objects over a plurality of time intervals.

Figure 7:
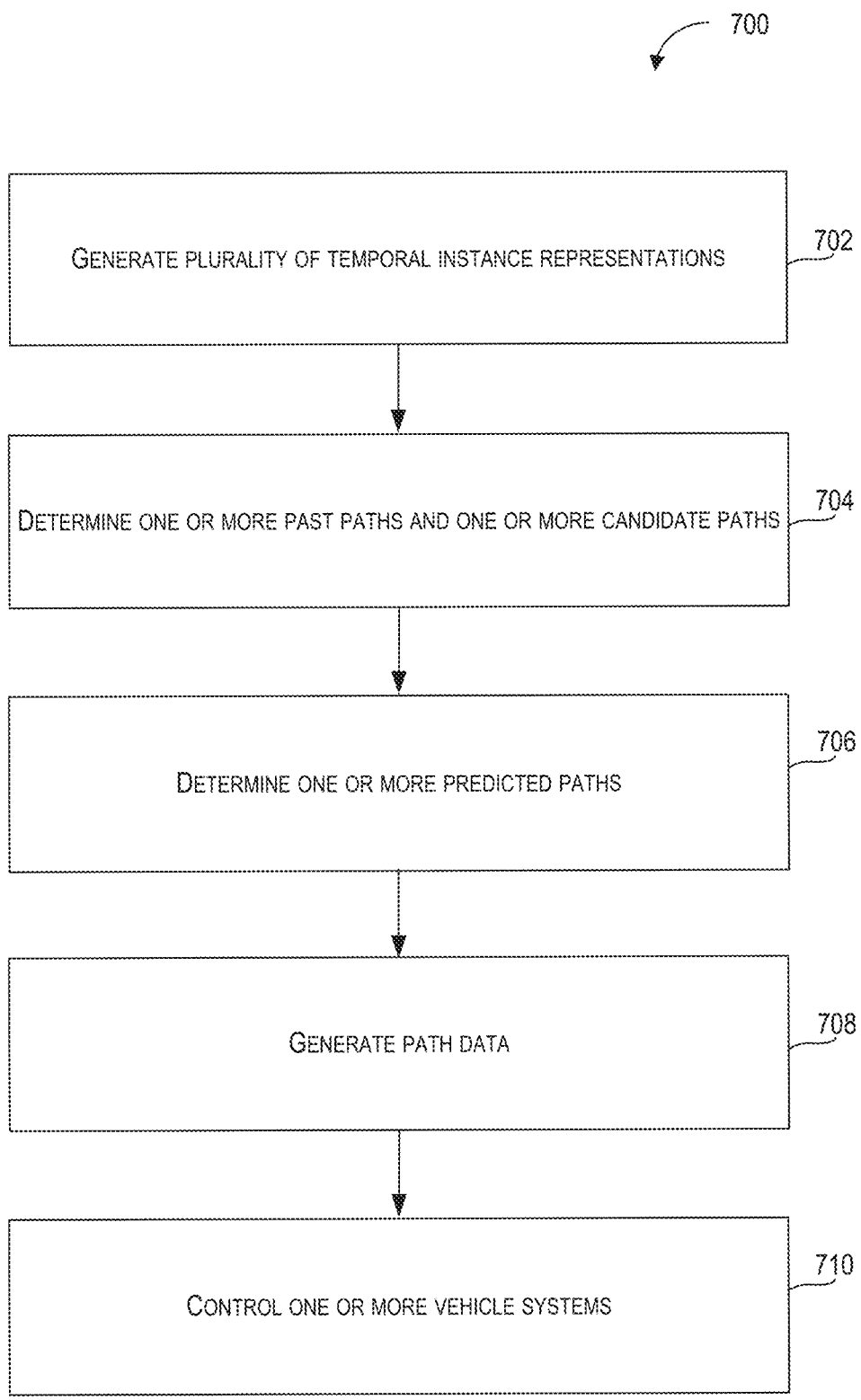
FIG. 7 depicts a flow diagram of an example method of perception and motion forecasting according to example embodiments of the present disclosure.

FIG. 7 depicts a flow diagram of an example method of perception and motion forecasting according to example embodiments of the present disclosure. One or more portions of a method 700 can be implemented by one or more devices (e.g., one or more computing devices) or systems including, for example, the operations computing system 104, the vehicle 108, or the vehicle computing system 112, shown in FIG. 1. Moreover, one or more portions of the method 700 can be implemented as an algorithm on the hardware components of the devices described herein (e.g., as in FIG. 1). FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 702, the method 700 can include generating and/or determining a plurality of temporal instance representations and/or a plurality of trajectory level representations. Each temporal instance representation and/or trajectory level representation can be associated with differences in an appearance and/or a motion of one or more objects over past time intervals. The plurality of temporal instance representations and/or the plurality of trajectory level representations can be generated based at least in part on data including sensor data (e.g., LiDAR data and/or image data) and/or map data (e.g., an overhead representation of a geographic region including a location captured by the sensor data). In some embodiments, the sensor data and the map data can be included in multi-sensor data that is used to generate the plurality of temporal instance representations and/or the plurality of trajectory level representations.

For example, the vehicle computing system 112 can generate and/or determine the plurality of temporal instance representations and/or the plurality of trajectory level representations based at least in part on input including multi-sensor data from various sources including the one or more sensors 114 (e.g., LiDAR data from one or more LiDAR devices and image data from one or more cameras) and map data from a remote computing device that provides maps including maps of the region in which the vehicle 108 associated with the vehicle computing system 112 is located. The multi-sensor data can be used as an input for any of a plurality of machine-learned feature extraction models (e.g., machine-learned models stored on the vehicle computing system 112) that have been configured and/or trained to generate an output (based at least in part on input including the multi-sensor data) including a plurality of feature maps associated with the appearance and the motion of one or more objects (one or more objects associated with the multi-sensor data) over the one or more past time intervals. The vehicle computing system 112 can then generate the plurality of temporal instance representations based at least in part on the plurality of feature maps.

At 704, the method 700 can include determining and/or generating one or more past paths of the one or more objects, one or more past trajectories of the one or more objects, and/or one or more candidate paths of the set of objects. Determination of the one or more past paths, the one or more past trajectories, and/or the one or more candidate paths can be based at least in part on the plurality of temporal instance representations and current detections (e.g., the most recent detections of objects) of a set of objects including the one or more objects. The one or more past paths and/or the one or more past trajectories of the one or more objects can include one or more paths of the one or more objects over the past time intervals. The one or more candidate paths can include one or more paths of the set of objects over a set of time intervals including a current time interval and at least one of the past time intervals. Furthermore, the one or more candidate paths can be based at least in part on the temporal instance representations and current detections that include the state (e.g., the location and/or appearance) of the one or more objects that were previously detected as well as the state of any newly detected objects.

By way of example, the vehicle computing system 112 can use the plurality of temporal instance representations to determine the one or more past paths and/or the one or more past trajectories based at least in part on the past locations of the one or more objects (e.g., locations of the objects relative to the vehicle 108 and/or geographic coordinates including latitude, longitude, and/or altitude) that were detected by the one or more sensors 114.

At 706, the method 700 can include determining and/or generating one or more predicted paths and/or one or more predicted trajectories of the set of objects. The one or more predicted paths and/or the one or more predicted trajectories of the set of objects can be based at least in part on one or more machine-learned models. The one or more machine-learned models can utilize the one or more past paths, one or more past trajectories, and/or the one or more candidate paths to determine, predict, and/or infer the one or more predicted paths.

For example, the vehicle computing system 112 can include one or more machine-learned models that are configured and/or trained to generate an output based at least in part on input including information associated with the one or more past paths and/or the one or more candidate paths. The output generated by the one or more machine-learned models can include information and/or data including the one or more predicted paths and/or one or more predicted trajectories of the set of objects. For example, the output of the one or more machine-learned models can include a set of locations (e.g., latitude, longitude, and/or altitude) associated with each object of the set of objects at one or more time intervals subsequent to the past time intervals and/or a current time interval.

At 708, the method 700 can include generating and/or determining path data and/or trajectory data. The path data can be based at least in part on and/or include information associated with the one or more predicted paths for each object of the set of objects respectively. The path data can include information associated with the set of locations (e.g., latitude, longitude, and/or altitude) that are part of the predicted path associated with each object of the set of objects at one or more time intervals subsequent to the past time intervals and/or a current time interval. In some embodiments, the path data can include information associated with the trajectory data and/or one or more predicted trajectories of the one or more objects. Furthermore, the trajectory data can be based on and/or include information associated with the one or more predicted trajectories for each object of the set of objects respectively. The trajectory data can include information associated with the trajectory that each object of the set of objects will follow at one or more time intervals subsequent to the past time intervals and/or a current time interval. By way of further example, the trajectory data can include information associated with the trajectory, position, location, orientation, bearing, velocity, and/or acceleration of each of the one or more objects.

Further, the path data and/or trajectory data can be formatted so that it can be provided as an input to various computing systems including computing systems associated with operation of an autonomous vehicle. For example, the vehicle computing system 112 can generate path data and/or trajectory data that can be provided as an input that is used to control one or more vehicle systems of the vehicle 108. By way of further example, the vehicle computing system 112 can provide the path data to a motion planning system of the vehicle 108, which can use the path data and/or trajectory data as part of generating a motion plan for the vehicle 108.

At 710, the method 700 can include controlling operation of a device. Controlling operation of a device can include controlling one or more vehicle systems of an autonomous vehicle. In some embodiments, controlling one or more vehicle systems of the autonomous vehicle can be based at least in part on one or more portions of the path data, the trajectory data, the plurality of temporal instance representations, and/or the plurality of trajectory level representations. For example, one or more vehicle systems of an autonomous vehicle can be controlled based at least in part on the path data and/or trajectory data.

The one or more vehicle systems of an autonomous vehicle can include one or more engine systems, one or more motor systems, one or more steering systems, one or more braking systems, one or more electrical systems, and/or one or more communications systems. For example, the vehicle computing system 112 can use the path data to determine the paths of detected objects in the environment traversed by the vehicle 108. The vehicle computing system 112 can then control engine systems and braking systems of the vehicle 108 to maneuver and control the velocity of the vehicle 108 around the paths of the detected objects.

In some embodiments, controlling the one or more vehicle systems of an autonomous vehicle can include planning a motion of the autonomous vehicle based at least in part on the one or more predicted paths of a set of objects. For example, the path data and/or the trajectory data can be used by the vehicle computing system 112 to determine a motion plan including a travel path for the vehicle 108 that avoids intersecting the detected objects based on the current location of the detected objects, the one or more predicted trajectories, and/or the one or more predicted paths of the set of detected objects.

Figure 8:
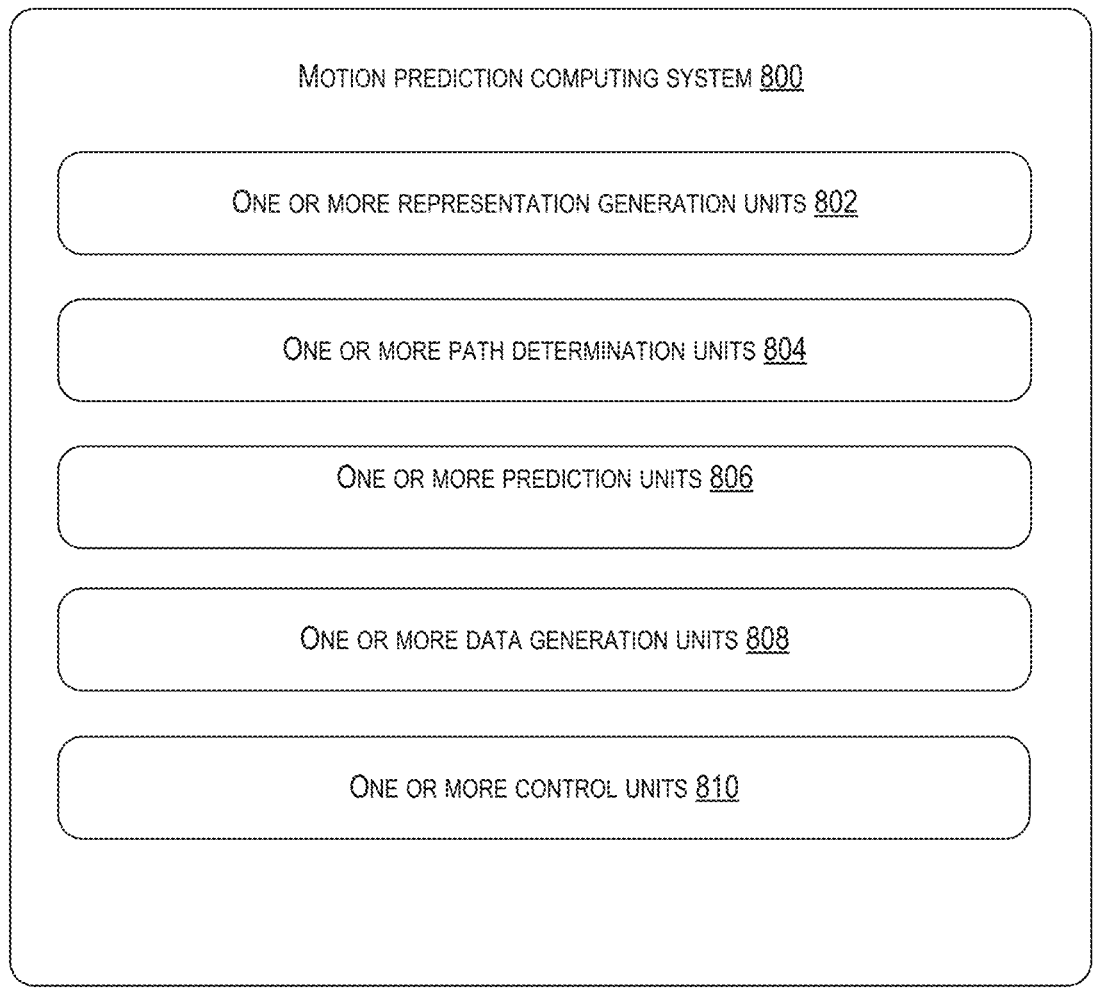
FIG. 8 depicts a diagram of an example system according to example embodiments of the present disclosure.

FIG. 8 depicts a diagram of an example system according to example embodiments of the present disclosure. One or more operations and/or functions in FIG. 8 can be implemented and/or performed by one or more devices (e.g., one or more computing devices) or systems including, for example, the operations computing system 104, the vehicle 108, or the vehicle computing system 112, which are shown in FIG. 1. Further, the one or more devices and/or systems in FIG. 8 can include one or more features of one or more devices and/or systems including, for example, the operations computing system 104, the vehicle 108, or the vehicle computing system 112, which are depicted in FIG. 1.

Various means can be configured to perform the methods and processes described herein. For example, motion prediction computing system 800 can include one or more representation generation units 802, one or more path determination units 804, one or more prediction units 806, one or more data generation units 808, one or more control units 810, and/or other means for performing the operations and functions described herein. In some implementations, one or more of the units may be implemented separately. In some implementations, one or more units may be a part of, or included in, one or more other units. These means can include one or more processors, one or more microprocessors, one or more graphics processing units, one or more logic circuits, one or more dedicated circuits, one or more application-specific integrated circuits (ASICs), programmable array logic, one or more field-programmable gate arrays (FPGAs), one or more controllers, one or more microcontrollers, and/or other suitable hardware. The means can also, or alternately, include software control means implemented with a processor or logic circuitry for example. The means can include or otherwise be able to access memory including, for example, one or more non-transitory computer-readable storage media, such as random-access memory, read-only memory, electrically erasable programmable read-only memory, erasable programmable read-only memory, one or more flash/other memory devices, one or more data registrars, one or more databases, and/or other suitable hardware.

The means can be programmed (e.g., an FPGA custom programmed to operate a motion prediction computing system) or configured (e.g., an ASIC custom designed and configured to operate a motion prediction computing system) to perform one or more algorithms for performing the operations and functions described herein. For example, the means (e.g., the one or more representation generation units 802) can be configured to generate and/or determine a plurality of temporal instance representations and/or a plurality of trajectory level representations. Each of the temporal instance representations and/or the plurality of trajectory level representations can be associated with differences in an appearance and motion of one or more objects over past time intervals.

In some embodiments, the means (e.g., the one or more representation generation units 802) can generate, based at least in part on a plurality of machine-learned feature extraction models and/or multi-sensor data, a plurality of feature maps associated with the appearance and the motion of the one or more objects over the one or more past time intervals. The multi-sensor data can be based at least in part on sensor outputs from a plurality of different types of sensors.

In some embodiments, the means (e.g., the one or more representation generation units 802) can generate and/or determine the plurality of temporal instance representations, and/or trajectory level representations based at least in part on the plurality of feature maps.

The means (e.g., the one or more path determination units 804) can be configured to determine, based at least in part on the plurality of temporal instance representations and current detections of a set of objects that can include the one or more objects, one or more past paths of the one or more objects over the past time intervals and one or more candidate paths of the set of objects over a set of time intervals that can include a current time interval and at least one of the past time intervals.

In some embodiments, the means (e.g., the one or more path determination units 804) can be configured to determine, based at least in part on the plurality of trajectory level representations and current detections of a set of objects that can include the one or more objects, one or more past trajectories of the one or more objects over the past time intervals and one or more candidate trajectories of the set of objects over a set of time intervals that can include a current time interval and at least one of the past time intervals.

In some embodiments, the means (e.g., the one or more path determination units 804) can determine, based at least in part on one or more comparisons of the set of objects to the one or more objects, whether the set of objects includes one or more newly detected objects not included in the one or more objects from the past time intervals.

In some embodiments, the means (e.g., the one or more path determination units 804) can associate the one or more newly detected objects with the at least one null path.

The means (e.g., the one or more prediction units 806) can be configured to determine and/or generate one or more predicted paths and/or predicted trajectories of the set of objects based at least in part on one or more machine-learned models. The one or more machine-learned models can utilize the one or more past paths, one or more predicted trajectories, one or more candidate predicted trajectories, and/or the one or more candidate paths to infer the one or more predicted paths.

In some embodiments, the means (e.g., the one or more prediction units 806) can determine a plurality of matching scores corresponding to the plurality of temporal instance representations and/or the plurality of trajectory level representations. Each of the plurality of matching scores can be based at least in part on differences between the appearance and the motion of the set of objects over the one or more past paths and the appearance and the motion of the set of objects over the one or more candidate paths.

In some embodiments, the means (e.g., the one or more prediction units 806) can determine the one or more predicted paths and/or predicted trajectories based at least in part on the plurality of matching scores associated with a least amount of difference in the appearance and the motion of the set of objects.

In some embodiments, the means (e.g., the one or more prediction units 806) can determine, for the one or more candidate paths, and based at least in part on the plurality of temporal instance representations and the one or more machine-learned models that can include a machine-learned refinement model, one or more confidence scores, one or more path refinements, and one or more candidate predicted paths.

In some embodiments, the means (e.g., the one or more prediction units 806) can generate one or more refined candidate paths based at least in part on the one or more candidate predicted paths and the one or more path refinements.

In some embodiments, the means (e.g., the one or more prediction units 806) can rank the one or more refined candidate paths based at least in part on the one or more confidence scores.

In some embodiments, the means (e.g., the one or more prediction units 806) can determine the one or more predicted paths based at least in part on the ranking of the one or more refined candidate paths.

The means (e.g., the one or more path data generation units 808) can be configured to generate path data that can include information associated with the one or more predicted paths for each object of the set of objects respectively.

In some embodiments, the means (e.g., the one or more path data generation units 808) can be configured to generate trajectory data that can include information associated with the one or more predicted trajectories for each object of the set of objects respectively.

The means (e.g., the one or more control units 810) can be configured to control one or more vehicle systems of the autonomous vehicle based at least in part on the path data and/or the trajectory data.

Figure 9:
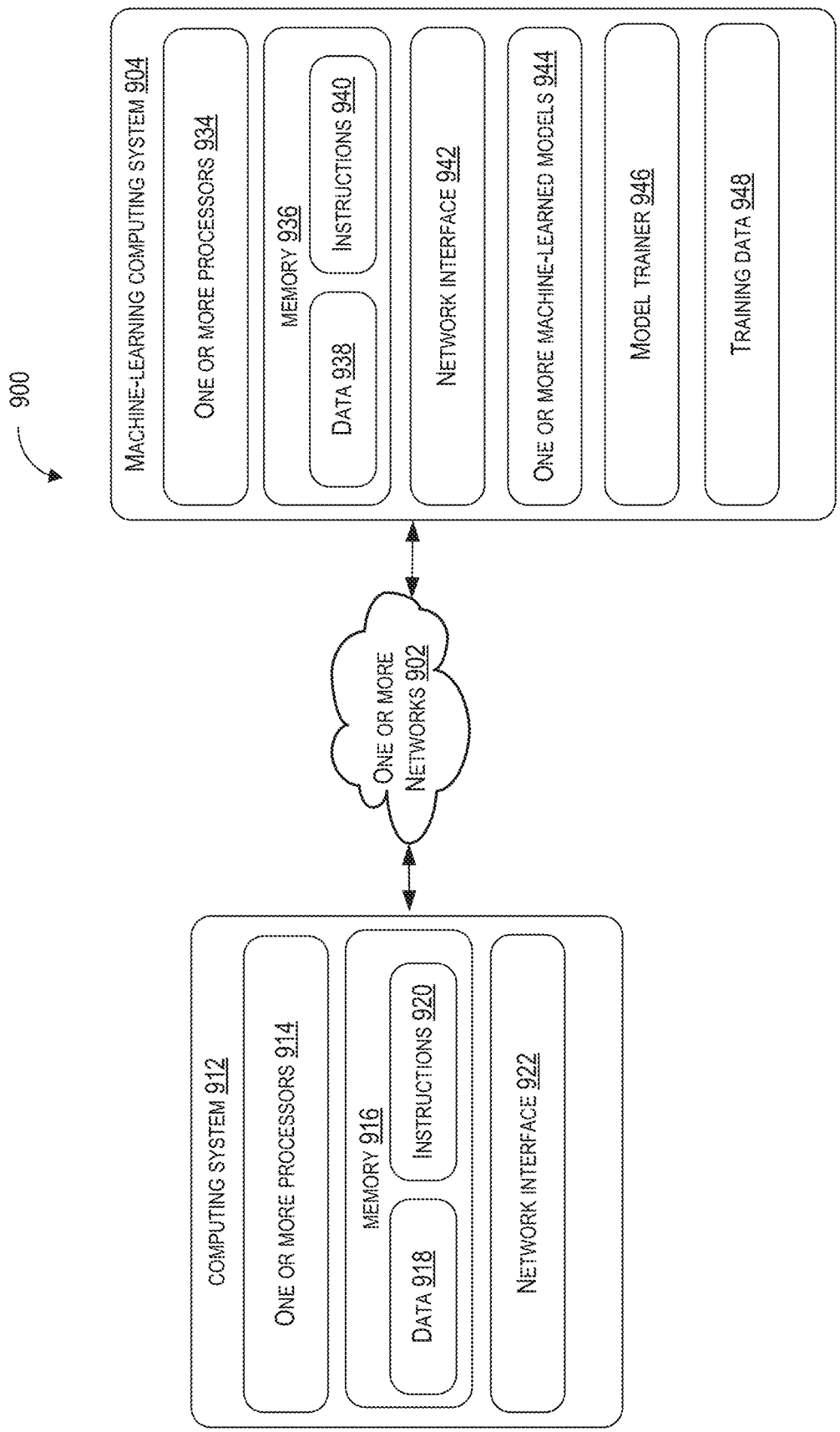
FIG. 9 depicts a diagram of an example system according to example embodiments of the present disclosure.

FIG. 9 depicts a block diagram of an example computing system 900 according to example embodiments of the present disclosure. The system 900 can include one or more networks 902 which can include one or more features of the communications network 102 depicted in FIG. 1; machine-learning computing system 904 which can include any of the attributes and/or capabilities of the operations computing system 104 depicted in FIG. 1; a computing system 912 which can include any of the attributes and/or capabilities of the vehicle computing system 112 depicted in FIG. 1; one or more processors 914; a memory 916; data 918; one or more instructions 920; a network interface 922; one or more machine-learned models 924; one or more processors 934; a memory 936; data 938; one or more instructions 940; a network interface 942; one or more machine-learned models 944; a model trainer 946; and training data 948.

The example system 900 includes the computing system 912 and the machine-learning computing system 904 that are communicatively coupled over the one or more networks 902.

In some implementations, the computing system 912 can perform operations including any of the operations described herein including operations associated with generating temporal instance representations based on the appearance and/or motion of objects over a plurality of time intervals; using the temporal instance representations, trajectory level representations, and/or current detections of the objects to determine the past paths and candidate paths for the objects; predicting paths of the objects based on the use of machine-learned models trained to receive the past paths and candidate paths as an input and generate the predicted paths as an output; and/or generating path data including the predicted paths for each of the objects. In some embodiments, the computing system 912 can use the trajectory level representations to generate trajectory data associated with one or more predicted trajectories of the objects. In some implementations, the computing system 912 can be included in an autonomous vehicle. For example, the computing system 912 can be on-board the autonomous vehicle. In other implementations, the computing system 912 is not located on-board the autonomous vehicle. For example, the computing system 912 can operate offline to perform any of the operations described herein including the operations associated with the generation of temporal instance representations as part of predicting the paths of objects. The computing system 912 can include one or more distinct physical computing devices.

The computing system 912 includes the one or more processors 914 and the memory 916. The one or more processors 914 can include any suitable processing device (e.g., a processor core, a microprocessor, an ASIC, a FPGA, a controller, and/or a microcontroller) and can include one processor or a plurality of processors that are operatively connected. The memory 916 can include one or more non-transitory computer-readable storage media, such as RAM, ROM, EEPROM, EPROM, one or more memory devices, and/or flash memory devices, and combinations thereof.

The memory 916 can store information that can be accessed by the one or more processors 914. For instance, the memory 916 (e.g., one or more non-transitory computer-readable storage mediums, memory devices) can store data 918 that can be obtained, received, accessed, retrieved, written, manipulated, modified, created, deleted, and/or stored. The data 918 can include, for instance, any of the data described herein, including temporal instance representation data, trajectory level representation data, path data, trajectory data, training data, and/or any data associated with prediction of object paths and/or operation of an autonomous device (e.g., an autonomous vehicle). In some implementations, the computing system 912 can obtain data from one or more memory devices that are remote from the system 912.

The memory 916 can also store the instructions 920 (e.g., computer-readable instructions) that can be executed by the one or more processors 914. The instructions 920 can be software written in any suitable programming language or can be implemented in hardware. Additionally, or alternatively, the instructions 920 can be executed in logically and/or virtually separate threads on the one or more processors 914.

For example, the memory 916 can store the instructions 920 that when executed by the one or more processors 914 cause the one or more processors 914 to perform any of the operations and/or functions described herein, including, for example, generating temporal instance representations and/or trajectory level representations, determining predicted paths of objects, and generating path data associated with the predicted paths of the objects. By way of further example, the one or more processors 914 can perform operations including generating matching scores using a matching function; generating path proposals using a path proposal function; and evaluating loss functions.

According to an aspect of the present disclosure, the computing system 912 can store or include one or more machine-learned models 924. As examples, the machine-learned models 924 can be or can otherwise include various machine-learned models such as, for example, neural networks, decision trees, logistic regression models, support vector machines, k-nearest neighbors models, Bayesian networks, and/or other types of models including linear models and/or non-linear models. Example neural networks include feed-forward neural networks, recurrent neural networks (e.g., long short-term memory recurrent neural networks), convolutional neural networks, recursive neural networks, and/or other forms of neural networks.

In some implementations, the computing system 912 can receive the one or more machine-learned models 924 from the machine-learning computing system 904 over the one or more networks 902 and can store the one or more machine-learned models 924 in the memory 916. The computing system 912 can then use or otherwise implement the one or more machine-learned models 924 (e.g., by the one or more processors 914). In particular, the computing system 912 can implement the one or more machine learned models 924 to determine predicted paths for objects which can also include determining generating feature maps based on multi-sensor data, determining candidate paths, and refining the candidate paths.

The machine-learning computing system 904 includes the one or more processors 934 and the memory 936. The one or more processors 934 can be any suitable processing device (e.g., a processor core, a microprocessor, an ASIC, a FPGA, a controller, and/or a microcontroller) and can be one processor or a plurality of processors that are operatively connected. The memory 936 can include one or more non-transitory computer-readable storage media, such as RAM, ROM, EEPROM, EPROM, one or more memory devices, flash memory devices, and combinations thereof.

The memory 936 can store information that can be accessed by the one or more processors 934. For instance, the memory 936 (e.g., one or more non-transitory computer-readable storage mediums, memory devices) can store data 938 that can be obtained, received, accessed, written, manipulated, created, and/or stored. The data 938 can include, for instance, temporal instance representation data, path data, and/or any data associated with predicting the paths of objects or operating an autonomous device as described herein. In some implementations, the machine-learning computing system 904 can obtain data from one or more memory devices that are remote from the system 904.

The memory 936 can also store the instructions 940 (e.g., computer-readable instructions) that can be executed by the one or more processors 934. The instructions 940 can be software written in any suitable programming language or can be implemented in hardware. Additionally, or alternatively, the instructions 940 can be executed in logically and/or virtually separate threads on the one or more processors 934.

For example, the memory 936 can store the instructions 940 that when executed by the one or more processors 934 cause the one or more processors 934 to perform any of the operations and/or functions described herein, including, for example, generating temporal instance representations, determining predicted paths of objects, and/or generating path data associated with the predicted paths of the objects. By way of further example, the one or more processors 914 can perform operations including generating matching scores using a matching function; generating path proposals using a path proposal function; and evaluating loss functions.

In some implementations, the machine-learning computing system 904 includes one or more server computing devices (not shown). If the machine-learning computing system 904 includes multiple server computing devices, such server computing devices can operate according to various computing architectures, including, for example, sequential computing architectures, parallel computing architectures, or some combination thereof.

In addition, or alternatively to the one or more machine-learned models 924 at the computing system 912, the machine-learning computing system 904 can include one or more machine-learned models 944. As examples, the machine-learned models 944 can be or can otherwise include various machine-learned models such as, for example, neural networks, decision trees, logistic regression models, support vector machines, k-nearest neighbors models, Bayesian networks, and/or other types of models including linear models and/or non-linear models. Example neural networks include feed-forward neural networks, recurrent neural networks (e.g., long short-term memory recurrent neural networks), convolutional neural networks, recursive neural networks, and/or other forms of neural networks.

As an example, the machine-learning computing system 904 can communicate with the computing system 912 according to a client-server relationship. For example, the machine-learning computing system 944 can implement the machine-learned models 944 to provide a web service to the computing system 912. For example, the web service can provide path data associated with the predicted paths of objects to a requesting computing system (e.g., the computing system 912).

Thus, one or more machine-learned models 924 can be located and used at the computing system 912; and/or the one or more machine-learned models 944 can be located and used at the machine-learning computing system 904.

In some implementations, the machine-learning computing system 904 and/or the computing system 912 can train the one or more machine-learned models 924 and/or the one or more machine-learned models 944 through use of a model trainer 946. The model trainer 946 can train the machine-learned models 924 and/or 944 using one or more training or learning algorithms. One example training technique is backwards propagation of errors. In some implementations, the model trainer 946 can perform supervised training techniques using a set of labeled training data. In other implementations, the model trainer 946 can perform unsupervised training techniques using a set of unlabeled training data. The model trainer 946 can perform a number of generalization techniques to improve the generalization capability of the models being trained. Generalization techniques include weight decays, dropouts, and/or other techniques.

In particular, the model trainer 946 can train the one or more machine-learned models 924 and/or the one or more machine-learned models 944 based on a set of training data 948. The training data 948 can include, for example, data associated with the appearance features (e.g., physical dimensions, colors, and other physical features) and/or motion features (e.g., velocity, acceleration, and/or geographic location at various time intervals) of objects. The model trainer 946 can be implemented in hardware, firmware, and/or software controlling one or more processors.

The computing system 912 can include the network interface 922, that is used to communicate with one or more systems or devices, including systems or devices that are remotely located from the computing system 912. The network interface 922 can include any circuits, components, and/or software for communicating with one or more networks (e.g., the one or more networks 902). In some implementations, the network interface 922 can include, for example, one or more of a communications controller, receiver, transceiver, transmitter, port, conductors, software, and/or hardware for communicating data. Similarly, the machine-learning computing system 904 can include the network interface 942.

The one or more networks 902 can include any type of network or combination of networks that allows for communication between devices. In some embodiments, the one or more networks can include one or more of a local area network, wide area network, the Internet, secure network, cellular network, mesh network, peer-to-peer communication link and/or some combination thereof and can include any number of wired or wireless links. Communication over the one or more networks 902 can be accomplished, for instance, via a network interface using any type of protocol, protection scheme, encoding, format, and/or packaging.

FIG. 9 illustrates one example computing system 900 that can be used to implement the present disclosure. Other computing systems can be used as well. For example, in some implementations, the computing system 912 can include the model trainer 946 and the training dataset 948. In such implementations, the machine-learned models 924 can be both trained and used locally at the computing system 912. As another example, in some implementations, the computing system 912 is not connected to other computing systems.

In addition, components illustrated and/or discussed as being included in one of the computing systems 912 and/or the machine-learning computing system 904 can instead be included in another of the computing systems 912 or the machine-learning computing system 904. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

The technology discussed herein makes reference to computing devices, databases, software applications, and other computer-based systems, as well as actions taken and information sent to and/or from such systems. One of ordinary skill in the art will recognize that the inherent flexibility of computer-based systems allows for a great variety of possible configurations, combinations, and divisions of tasks and functionality between and among components. For instance, computer-implemented processes discussed herein can be implemented using a single computing device or multiple computing devices working in combination. Data and/or instructions can be implemented on a single system or distributed across multiple systems. Distributed components can operate sequentially or in parallel.

Furthermore, computing tasks discussed herein as being performed at computing devices remote from the vehicle can instead be performed at the vehicle (e.g., via the vehicle computing system). Such configurations can be implemented without deviating from the scope of the present disclosure. The use of computer-based systems allows for a great variety of different possible configurations, combinations, and/or divisions of tasks and functionality between and/or among components. Computer-implemented tasks and/or operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of perception and motion forecasting, the computer-implemented method comprising:
   generating a plurality of temporal instance representations respectively associated with differences in an appearance and a motion of one or more objects over past time intervals, wherein the plurality of temporal instance representations respectively comprise one or more appearance features of the one or more objects at the past time intervals and one or more motion features of one or more objects at the past time intervals;
   determining, based at least in part on the plurality of temporal instance representations and current detections of a plurality of objects comprising the one or more objects, one or more past paths of the one or more objects over the past time intervals and one or more candidate paths of the plurality of objects over a plurality of time intervals comprising a current time interval and at least one of the past time intervals;
   determining one or more predicted paths of the plurality of objects based at least in part on one or more machine-learned models, the one or more machine-learned models utilizing the one or more past paths and the one or more candidate paths to infer the one or more predicted paths; and
   generating path data comprising information associated with the one or more predicted paths for the plurality of objects respectively.

2. The computer-implemented method of claim 1, wherein the one or more past paths comprise at least one null path, and wherein the determining based at least in part on the plurality of temporal instance representations and the current detections of the plurality of objects comprising the one or more objects comprises:
   determining, based at least in part on one or more comparisons of the plurality of objects to the one or more objects, whether the plurality of objects includes one or more newly detected objects not included in the one or more objects from the past time intervals; and
   associating the one or more newly detected objects with the at least one null path.

3. The computer-implemented method of claim 1, wherein the generating the plurality of temporal instance representations comprises:
   obtaining data associated with the motion of the one or more objects over the past time intervals from an object path memory; and
   obtaining data associated with the appearance of the one or more objects over the past time intervals from an appearance memory that is different from the object path memory.

4. The computer-implemented method of claim 1, wherein the generating the plurality of temporal instance representations comprises:
   generating based at least in part on a plurality of machine-learned feature extraction models and multi-sensor data, a plurality of feature maps associated with the appearance and the motion of the one or more objects over the one or more past time intervals, wherein the multi-sensor data is based at least in part on sensor outputs from a plurality of different types of sensors; and
   generating the plurality of temporal instance representations based at least in part on the plurality of feature maps.

5. The computer-implemented method of claim 4, wherein the multi-sensor data comprises one or more light detection and ranging (LiDAR) sweeps, map data comprising information associated with one or more locations in an environment comprising the one or more objects, or one or more images comprising the one or more objects.

6. The computer-implemented method of claim 1, wherein the plurality of temporal instance representations respectively comprise a concatenation of one or more appearance features and one or more motion features respectively associated with the appearance and the motion of the one or more objects over the past time intervals.

7. The computer-implemented method of claim 1, wherein a number of the one or more candidate paths is at least as great as a combination of a number of the one or more past paths and a number of the current detections of the plurality of objects.

8. The computer-implemented method of claim 1, wherein the determining the one or more predicted paths of the plurality of objects based at least in part on one or more machine-learned models comprises:
   determining a plurality of matching scores corresponding to the plurality of temporal instance representations, wherein the plurality of matching scores are respectively based at least in part on differences between the appearance and the motion of the plurality of objects over the one or more past paths and the appearance and the motion of the plurality of objects over the one or more candidate paths; and
   determining the one or more predicted paths based at least in part on the plurality of matching scores associated with a least amount of difference in the appearance and the motion of the plurality of objects.

9. The computer-implemented method of claim 1, wherein the one or more machine-learned models are configured to respectively compare the appearance and the motion of the plurality of objects along the one or more past paths at the past time intervals to the appearance and the motion of the plurality of objects along the one or more candidate paths at the past time intervals.

10. The computer-implemented method of claim 1, wherein the one or more machine-learned models are trained based at least in part on minimization of a loss associated with one or more differences between one or more predicted training paths and one or more ground-truth paths, wherein the one or more predicted training paths are generated using training data and the one or more machine-learned models, and wherein the training data comprises a plurality of training temporal instance representations and a plurality of training object detections.

11. The computer-implemented method of claim 10, wherein the loss is based at least in part on a loss function associated with a detection loss, a matching loss, a confidence score loss, a refinement loss, or a prediction loss.

12. The computer-implemented method of claim 10, wherein the loss is inversely correlated with similarity of the one or more predicted training paths relative to the one or more ground-truth paths.

13. The computer-implemented method of claim 1, wherein the determining the one or more predicted paths of the plurality of objects based at least in part on one or more machine-learned models comprises:
  determining for the one or more candidate paths, and based at least in part on the plurality of temporal instance representations and the one or more machine-learned models comprising a machine-learned refinement model, one or more confidence scores, one or more path refinements, and one or more candidate predicted paths;
  generating one or more refined candidate paths based at least in part on the one or more candidate predicted paths and the one or more path refinements;
  ranking the one or more refined candidate paths based at least in part on the one or more confidence scores; and
  determining the one or more predicted paths based at least in part on the ranking of the one or more refined candidate paths.

14. The computer-implemented method of claim 13, wherein the one or more confidence scores are associated with a respective estimated accuracy of the one or more candidate predicted paths, and wherein the one or more path refinements comprise adjustments of bounding boxes associated with the appearance of the plurality of objects along the one or more candidate paths.

15. A computing system comprising:
  one or more processors;
  a memory comprising one or more tangible non-transitory computer-readable media, the memory storing computer-readable instructions for execution by the one or more processors that cause the computing system to perform operations comprising:
    generating a plurality of temporal instance representations respectively associated with differences in an appearance and a motion of one or more objects over past time intervals, wherein the plurality of temporal instance representations respectively comprise one or more appearance features of the one or more objects at the past time intervals and one or more motion features of one or more objects at the past time intervals;
    determining, based at least in part on the plurality of temporal instance representations and current detections of a plurality of objects comprising the one or more objects, one or more past paths of the one or more objects over the past time intervals and one or more candidate paths of the plurality of objects over a plurality of time intervals comprising a current time interval and at least one of the past time intervals;
    determining one or more predicted paths of the plurality of objects based at least in part on one or more machine-learned models, the one or more machine-learned models utilizing the one or more past paths and the one or more candidate paths to infer the one or more predicted paths; and
    generating path data comprising information associated with the one or more predicted paths for the plurality of objects respectively.

16. The computing system of claim 15, wherein determining the one or more predicted paths of the plurality of objects based at least in part on one or more machine-learned models comprises determining a respective confidence score associated the one or more predicted paths.

17. The computing system of claim 15, wherein the one or more appearance features comprise colors, intensities, textures, or edges of each of the one or more objects, and wherein the one or more motion features comprise one or more locations of each of the one or more objects or one or more headings of each of the one or more objects.

18. An autonomous vehicle comprising:
  one or more processors;
  a memory comprising one or more tangible non-transitory computer-readable media, the memory storing computer-readable instructions for execution by the one or more processors that cause the computing system to perform operations comprising:
    generating a plurality of temporal instance representations respectively associated with differences in an appearance and a motion of one or more objects over past time intervals, wherein the plurality of temporal instance representations respectively comprise one or more appearance features of the one or more objects at the past time intervals and one or more motion features of one or more objects at the past time intervals;
    determining, based at least in part on the plurality of temporal instance representations and current detections of a plurality of objects comprising the one or more objects, one or more past paths of the one or more objects over the past time intervals and one or more candidate paths of the plurality of objects over a plurality of time intervals comprising a current time interval and at least one of the past time intervals;
    determining one or more predicted paths of the plurality of objects based at least in part on one or more machine-learned models, the one or more machine-learned models utilizing the one or more past paths and the one or more candidate paths to infer the one or more predicted paths; and
    generating path data comprising information associated with the one or more predicted paths for the plurality of objects respectively.

19. The autonomous vehicle of claim 18, wherein the path data is part of an input to a motion planning system of the autonomous vehicle.

20. The autonomous vehicle of claim 18, further comprising:
  controlling one or more vehicle systems of the autonomous vehicle based at least in part on the path data.

* * * * *